US005291193A

United States Patent [19]

Isobe et al.

[11] Patent Number: 5,291,193

[45] Date of Patent: Mar. 1, 1994

[54] IDENTIFICATION REGISTRATION FOR A WIRELESS TRANSMISSION-RECEPTION CONTROL SYSTEM

[75] Inventors: Yoichi Isobe; Hiroshi Chujo; Kouichi Okumura; Hisashi Kumagai, all of Kadoma, Japan

[73] Assignee: Matsushita Electric Works, Ltd., Osaka, Japan

[21] Appl. No.: 810,877

[22] Filed: Dec. 20, 1991

Related U.S. Application Data

[60] Continuation of Ser. No. 581,192, Sep. 11, 1990, abandoned, which is a division of Ser. No. 299,532, Jan. 18, 1989, abandoned.

[30] Foreign Application Priority Data

Jan. 21, 1988 [JP] Japan ................................ 63-11786

[51] Int. Cl.[5] ................................................ H04Q 1/00

[52] U.S. Cl. .......................... 340/825.69; 340/825.52; 341/176; 455/129; 361/749

[58] Field of Search ...................... 340/825.69, 825.52, 340/825.72; 455/125, 128, 347, 129; 361/398; 341/176

[56] References Cited

U.S. PATENT DOCUMENTS 3,735,106 5/1973 Holloway .
4,327,444 4/1982 Court .
4,418,333 11/1983 Schwarzbach ................ 340/825.07
4,471,493 9/1984 Schober .
4,535,333 8/1985 Twardowski ................. 340/825.69
4,628,315 12/1986 Douglas .
4,670,746 6/1987 Taniguchi et al. .
4,750,118 6/1988 Heitschel ....................... 340/825.69
4,779,340 10/1988 Kihm et al. .
4,855,713 8/1989 Brunius .
4,890,108 12/1989 Drori et al. .
4,939,792 7/1990 Urbish ............................... 455/347
4,963,876 10/1990 Sanders .

FOREIGN PATENT DOCUMENTS 2023899 1/1980 United Kingdom .

*Primary Examiner*—Donald J. Yusko
*Assistant Examiner*—Brian Zimmerman
*Attorney, Agent, or Firm*—Leydig, Voit & Mayer

[57] ABSTRACT

A wireless transmission-reception control system in which the data transmitted as a radio wave from more than one wireless transmitter along with an ID code are received by a wireless receiver and decoded at a front end decoder. The ID code of the transmitted data thus received is compared by a comparer with the ID code of the transmitted data already registered at a data register to discriminate if a collation of the data is to be made [or not], and only the transmitted data, the registration of which is confirmed, are decoded to have an output generated. The wireless transmitters each have different, fixed ID codes, and the wireless receiver may be switched over at least between a mode of registering an ID code and a mode of generating an output after the decoding of the transmitted data.

1 Claim, 19 Drawing Sheets

IDENTIFICATION REGISTRATION FOR A WIRELESS TRANSMISSION-RECEPTION CONTROL SYSTEM

BACKGROUND OF THE INVENTION

This application is a continuation of Ser. No. 07/581,192 filed Sept. 11, 1990 now abandoned, which is a division of Ser. No. 07/299,532 filed Jan. 18, 1989 and now abandoned. This invention relates to wireless transmission-reception control systems which carry out a signal transmission utilizing an extremely low frequency wave.

Wireless transmission-reception control systems of the kind referred to finds utility when applied to first-aid communication systems, security communication systems, calling systems, remote instrument control systems, and the like.

DISCLOSURE OF PRIOR ART

Wireless transmission-reception control systems have been widely utilized as remote control systems in recent years to avoid mutual interference between the respective systems. For this purpose, a channel defining house code is provided for data transmitted in each system, coincidence of such house code is confirmed upon receiving the transmitted data, and any radio interference with another system is prevented from occurring.

One of the systems of the kind referred to has been disclosed in Japanese Patent Application Laid-Open Publication No. 57-12891 by H. Ikeda, which is a reception arrangement comprising a single reception unit and a plurality of display units connected to the reception unit and including many display elements arranged for channel display. According to this arrangement, the reception unit is employed in common by the respective display units so no receiving function is required to be provided to the respective display units, to restrain in particular any deterioration in S/N ratio, and to allow calling order for the respective display elements to be easily discriminated.

When it is intended, however, to use a large number of such units in first-aid communication, security communication, calling, remote instrument control, and the like systems, it is not simple for the end user to set the house code for the wireless transmitters or receivers. The problems in setting the house codes may raise a bar to the large scale use of given systems and radio interference may occur if an error occurs in setting the house codes.

SUMMARY OF THE INVENTION

A primary object of the present invention is, therefore, to provide a wireless transmission-reception control system which makes setting the house code by the end user unnecessary and allows an ID code of transmitted data from the respective wireless transmitters to be automatically registered in the wireless receivers.

According to the present invention, this object is attained by providing a wireless transmission-reception control system in which the data transmitted as a radio wave from more than one wireless transmitter along with an ID code are received by a wireless receiver and decoded at a front end decoder means. The ID code of the transmitted data thus received is compared by a comparing means with the ID code of the transmitted data already registered at a data registering means to discriminate if a collation of the data is to be made [or not], and only the transmitted data, the registration of which is confirmed, are decoded to have an output generated. The wireless transmitters each have different, fixed ID codes, and the wireless receiver may be switched over at least between a mode of registering an ID code and a mode of generating an output after the decoding of the transmitted data.

Other objects and advantages of the present invention shall become clear in the following explanation of the invention detailed with reference to embodiments shown in the accompanying drawings.

Figure 1:
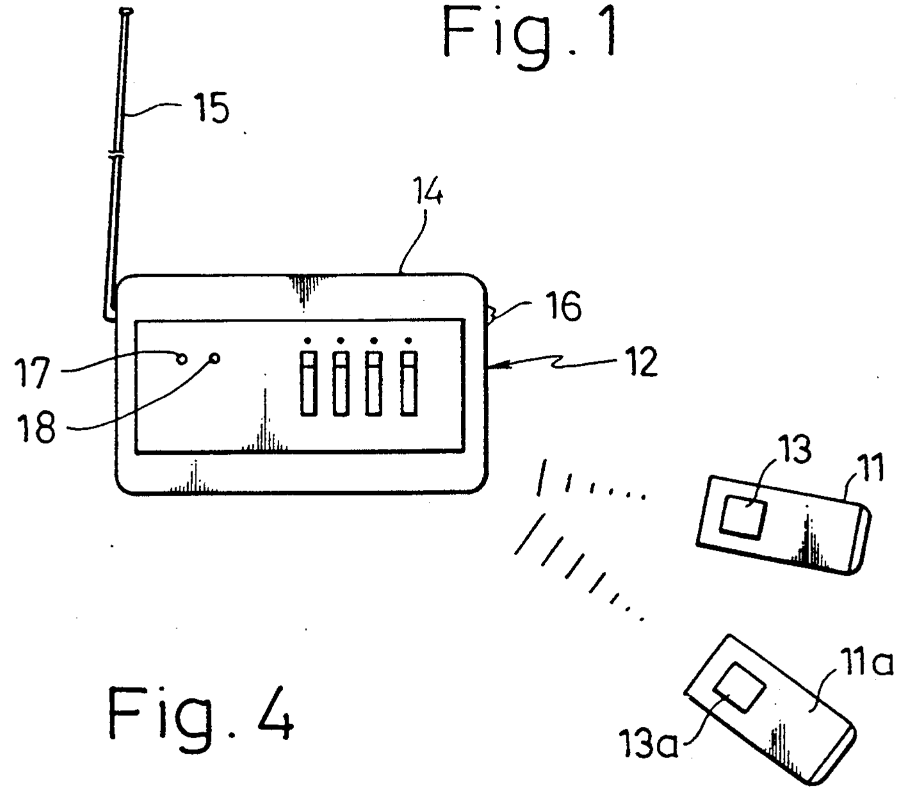
FIG. 1 is an explanatory view of an example of the wireless transmission-reception control system according to the present invention.

It should be appreciated here that, while the present invention shall now be explained with reference to the respective embodiments shown in the drawings, the intention is not to limit the invention only to these embodiments but rather to include all alterations, modifications, and equivalent arrangement within the scope of appended claims.

DISCLOSURE OF PREFERRED EMBODIMENTS

Referring to FIG. 1, a wireless transmission-reception control system according to the present invention includes a plurality (only two are shown in the drawing) of wireless transmitters 11 and 11*a* which are preferably of a thin card type, and a wireless receiver 12 which receives data transmitted from the wireless transmitters 11 and 11*a*. A call switch 13 or 13*a* functioning as a control switch is provided on a top surface of the wireless transmitter 11 or 11*a*. The wireless receiver 12 generally comprises a body casing 14 and an antenna 15 mounted to the casing 14. There are provided on the casing 14, as required, an operating slide switch 16, mode indicating lamp 17, and operation indicating lamp 18.

According to the present invention, preferably a plurality of the wireless transmitters 11, 11*a* and the single wireless receiver 12 are combined to form the system. If desired, the system may be formed by combining a plurality of the wireless receivers 12 with the plurality of wireless transmitters 11, 11*a*.

Figure 2:
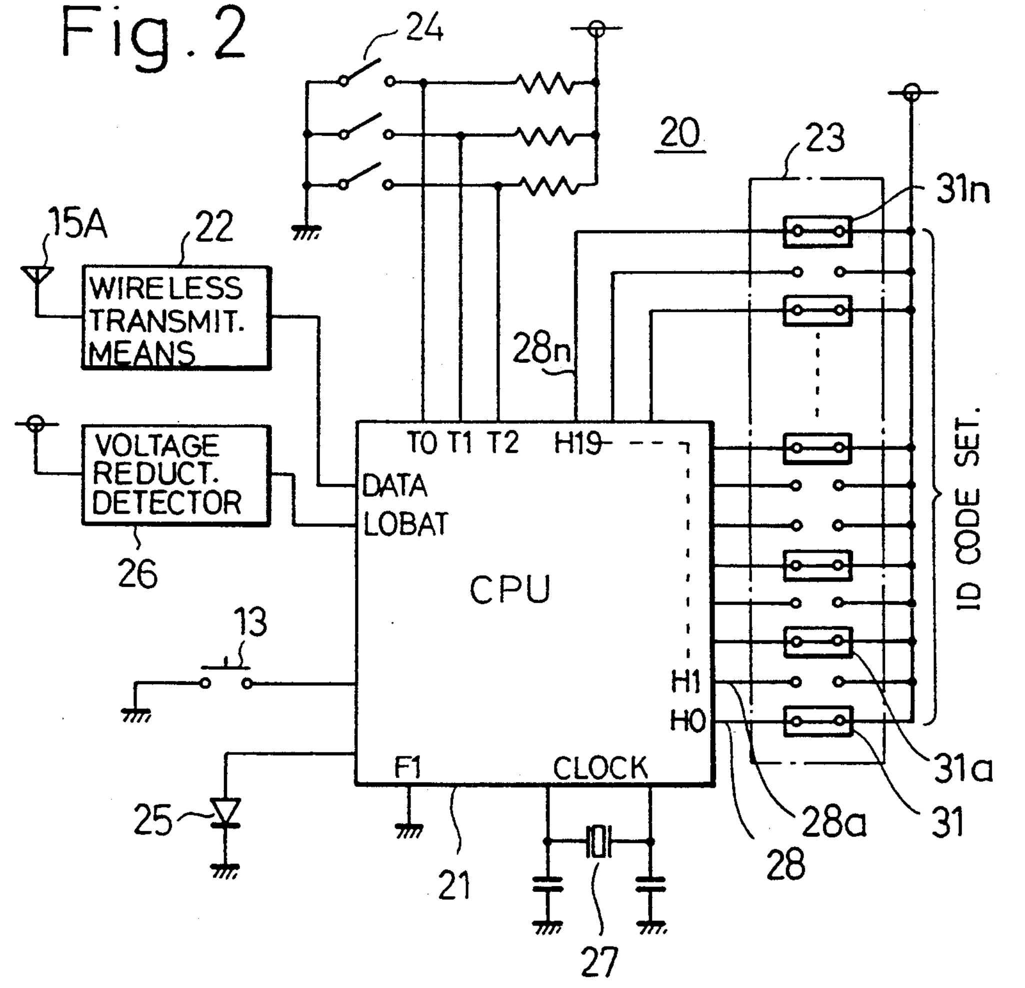
FIG. 2 is a circuit diagram of one of the wireless transmitters employed in the system of FIG. 1.

The wireless transmitters 11 and 11*a* shall be detailed first. Referring to FIG. 2, there is shown a transmission control circuit 20 incorporated in each of the transmitters 11, 11*a*, and this circuit 20 includes a microcomputer formed by a one-chip CPU 21 to which is connected the call switch 13 as well as a wireless transmitter means 22 including an antenna 15A and an ID code section 23 in which an ID code is fixed. In the present instance, a set of transmission data defining, for example, a call sound of a tone pattern preliminarily set together with the ID code, are provided from the CPU 21 to the wireless transmitter and a radio wave signal from the antenna 15A is transmitted toward the wireless receiver 12. The tone pattern is set by means of a switch assembly 24, that is, a voltage applied to the CPU 21 is varied by turning switches of the assembly 24 on and off so as to set the tone pattern to be transmitted as the transmission data. Also connected to the CPU 21 is an indicating lamp 25 to be lit upon operation of the call switch 13. The wireless transmitters 11, 11*a* incorporate therein a cell (not shown), and a cell voltage drop detector 26 is connected to the CPU 21 to detect a lower voltage level of the cell than a set level, so that a detection signal of the detected lower voltage will be transmitted out of the CPU 21 included in the transmission data. A reference clock generator 27 is connected to the CPU 21.

Figure 4:
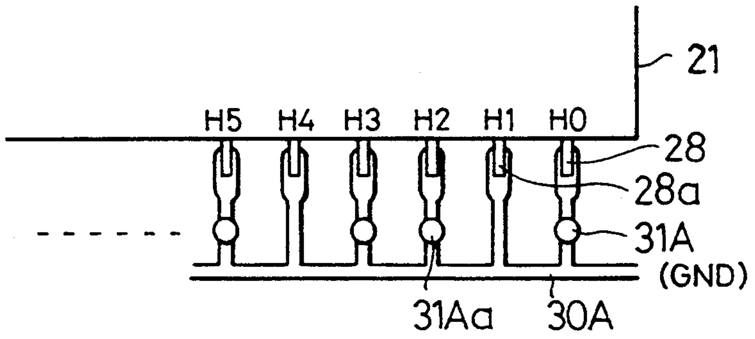
FIGS. 3 to 5 are explanatory views of different arrangements for providing a fixed ID code to the wireless transmitters in the system of FIG. 1.
Figure 5:
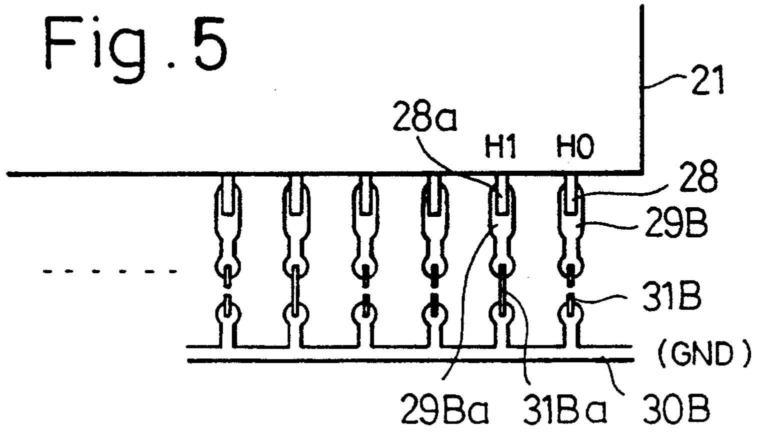
Figure 3:
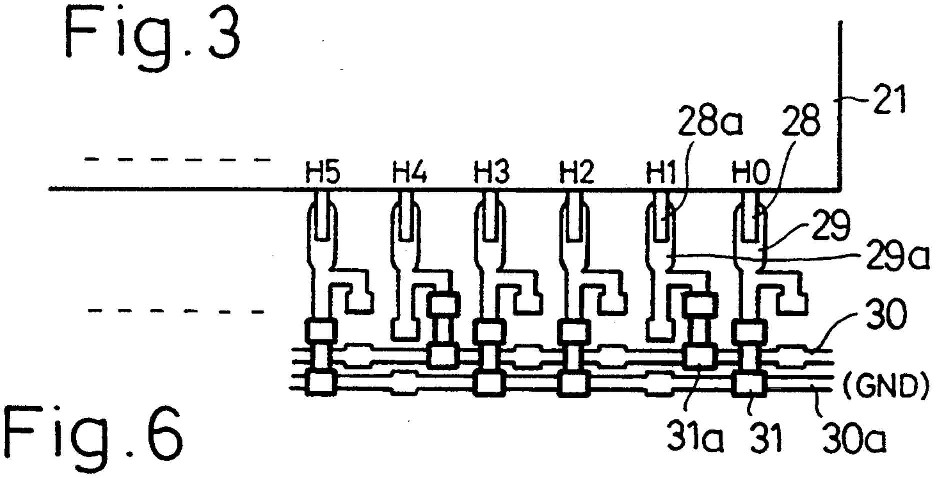

In providing different, fixed ID codes to the respective wireless transmitters 11 and 11*a*, there may be employed such a setting means as shown, for example, in any of FIGS. 3 to 5, that is, in FIG. 3, lead wires 28, 28*a* . . . 28*n* of the CPU 21 are each provided respectively with first conduction pattern elements 29, 29*a* . . . 29*n*. A pair of mutually isolated second conduction pattern elements 30 and 30*a* are formed adjacent the first elements 29, 29*a* . . . 29*n* so that one of the second elements 30 and 30*a* will be at Vcc level while the other is at ground level (GND). The first conducting pattern elements 29, 29*a* . . . 29*n* are respectively connected to either one of the second conduction pattern elements 30 and 30*a* through conducting chips 31, 31*a*, . . . 31*n*. A specific ID code to each of the wireless transmitters 11 and 11*a* can be set and provided thereto.

In another means of FIG. 4, a comb-teeth shaped conducting pattern 30A is formed as connected initially to the respective lead wires 28, 28*a* . . . 28*n* of the CPU 21, and then the connection of the pattern 30A at ground level is broken with respect to proper ones of the lead wires 28, 28*a* . . . 28*n* by means of punch holes 31A, 31A*a* . . . 31A*n* made by punching off connecting portions of the pattern to the lead wires, and the ID code is thereby set.

In FIG. 5, the lead wires 28, 28*a* . . . 28*n* are provided with conducting lands 29B, 29B*a* . . . 29B*n*, a comb-teeth shaped conducting pattern 30B made at ground level is connected through jumpers 31B, 31B*a* . . . 31B*n*, and then proper ones of the jumpers 31B, 31B*a* . . . 31B*n* for setting the ID code are cut to break the connection. Utilizing any one of the foregoing ID code setting arrangements, it should be appreciated that the ID code setting can be executed advantageously at the same time as assembling and mounting a circuit substrate.

Figure 6:
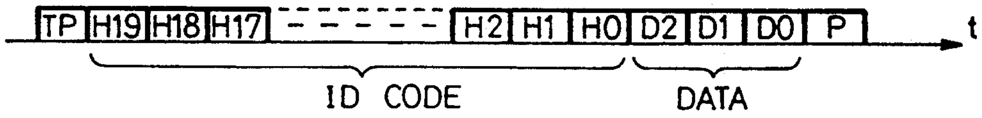
FIG. 6 shows a format of the signals transmitted from the wireless transmitters in the system of FIG. 1.

In the present embodiment, the transmission data are transmitted from the wireless transmitting means 22 of the wireless transmitter 11 as a radio wave signal in such a signal format of one frame as shown in FIG. 6, that is, 20 bits of HO to H19 are assigned for the ID code, a pre-receive TP is provided to the top, 3 bits of transmission data DO to D2 are provided after the ID code, and a parity check P is provided at the end. With such 20 bits employed, it is possible to set about 1,000,000 different ID codes, but the bit number for the ID code may be increased or decreased as occasion demands.

Figure 7:
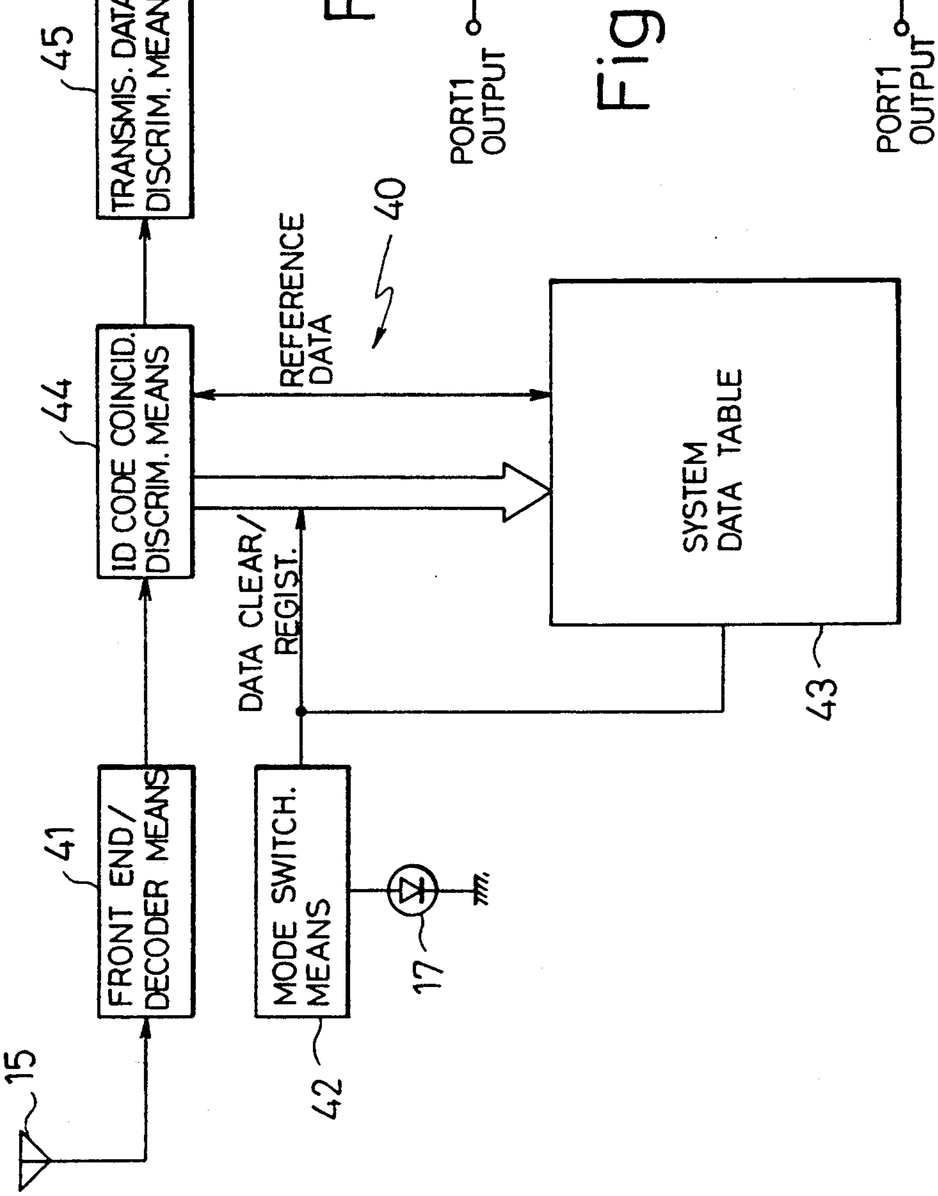
FIG. 7 is a block diagram of a basic circuit for the wireless receiver in the system of FIG. 1.

The wireless receiver 12 shall be referred to in detail next. In FIG. 7, there is shown a basic arrangement for a reception circuit 40, which generally comprises a front end decoder 41 for decoding and taking out the transmission data received through the antenna 15, a mode switch 42 for switching the setting of the receiver operation mode between a registering mode and a normal mode, and a system data table 43 for registering therein at least the ID code provided to the transmission data. The ID code taken out of the front end decoder 41 is provided to a discriminator 44 for comparing the ID code with the already registered ID code in the system data table 43 and discriminating whether they coincide. When the ID code provided to the transmission data and the already registered ID code coincide, contents of the transmission data to which the coincidental ID code is provided are decoded by a transmission data discriminator 45. A necessary control signal is provided out of the discriminator 45 for driving a later staged alarming means or the like (not shown). When the mode switch 42 is actuated manually or by means of an automatic setting employing a timer delay operation to be set into the registering mode, the ID code of the transmission data transmitted from the wireless transmitter 11 or 11*a* can be automatically registered at the table 43. When the mode switch 42 is set in the normal mode, the ID code coincidence discriminator 44 is actuated and the foregoing compare is executed. If necessary, the switch operation of the mode switch 42 may be displayed by turning the indicating lamp 17 connected to the means 42 on and off.

Figure 8:
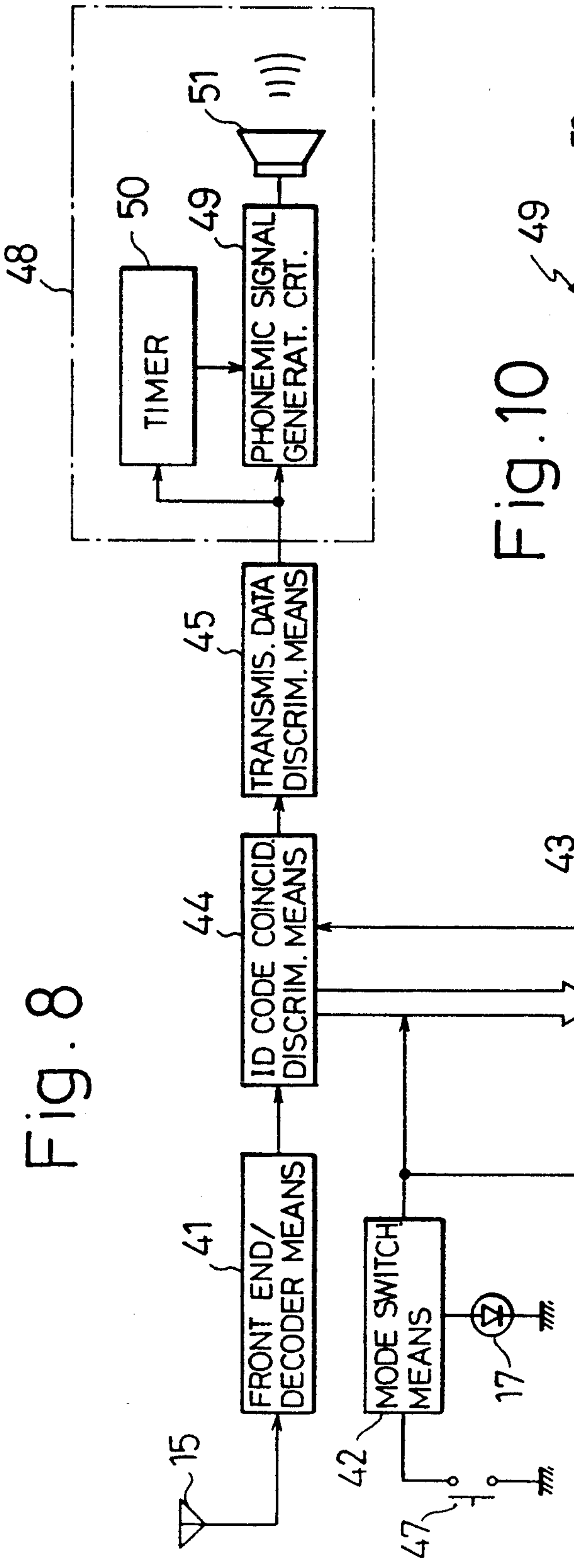
FIG. 8 is a block diagram showing a more detailed circuit for the wireless receiver.

Provided that the mode switch 42 is to be manually switched over, it is preferable that a manual change-over switch 47 provided to the mode switch 42 as shown in FIG. 8, so that the means 42 can be set either into the registering mode or into the normal mode by manually actuating the switch 47.

Figure 9:
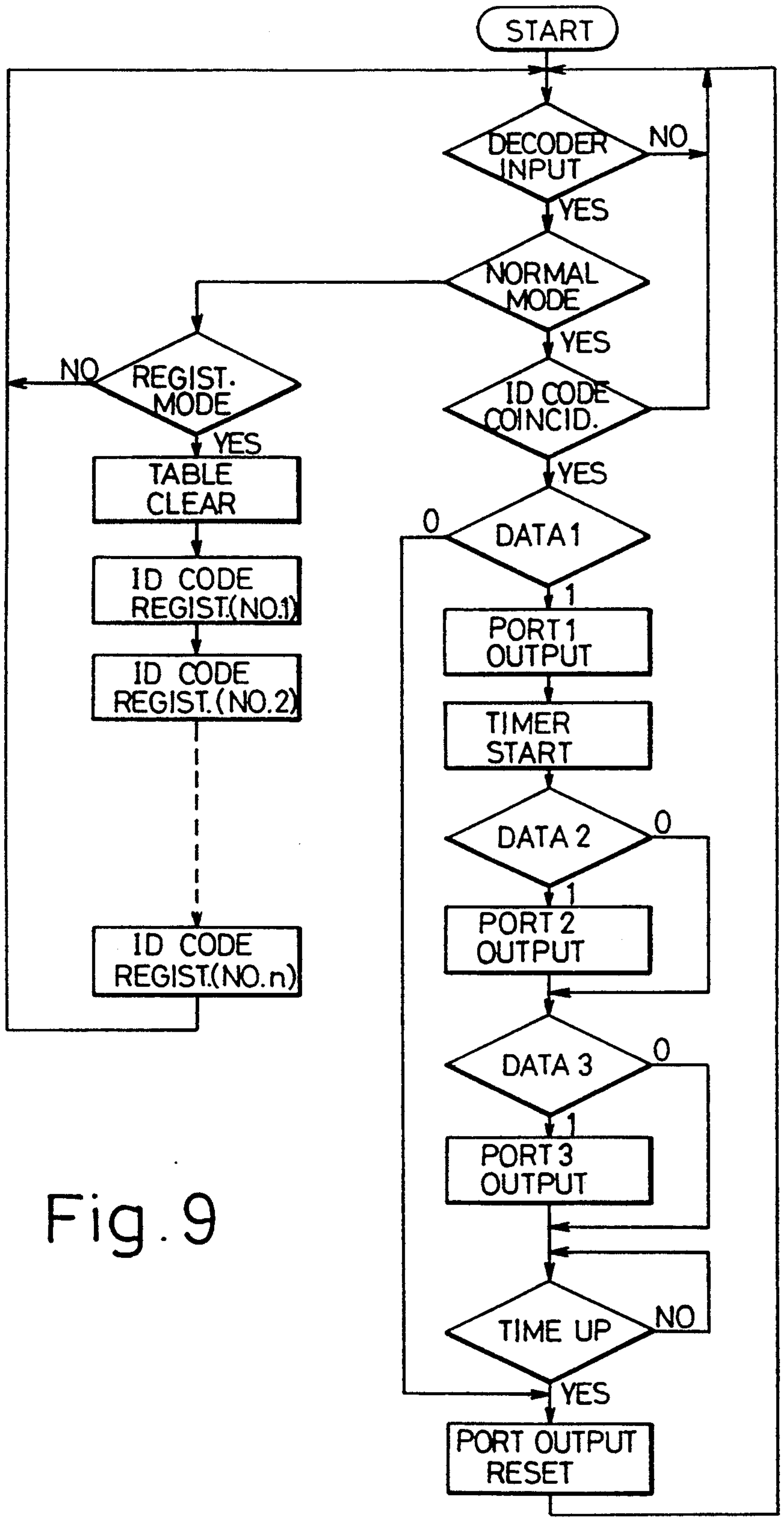
FIG. 9 is an operation flow-chart for the wireless receiver of FIG. 8.

Referring next to the operation of the wireless receiver 12 as described in the flow-chart of FIG. 9, the manual switch 47 is first depressed to actuate the mode switch 42 to switch the mode over to the registering mode. The indicating lamp 17 is thereby lighted, and the data registered in the system data table 43 are all cleared. In this state, pressing the call switch 13 at the wireless transmitter 11 of FIG. 1 causes the transmission data in the transmitter 11 to be transmitted as a radio wave signal. The transmitted data received through the antenna 15 by the wireless receiver 12 are decoded at the front end decoder 41, and the ID code is taken out of the data. The ID code is registered as it is at the system data table 43.

When the call switches of the remaining wireless transmitters are sequentially depressed to have their data transmitted to the receiver 12, the ID codes of the plurality of the wireless transmitters included in the system are sequentially registered in the wireless receiver 12. In this case, any ID code identical with an already registered ID code is nullified upon being provided to the system data table 43 to prevent an double registering of the same ID code. The system data table 43 is preferably of a storing capacity sufficient for registering all of the ID codes determined by the bit number but, in practice, the capacity may be only large enough for the ID codes of the number of wireless transmitters included in the system.

Next, the manual switch 47 is depressed again to actuate the mode switch 42, and the mode is switched over to the normal mode. When the wireless receiver 12 is in the normal mode, the transmitted data received through the antenna 15 by the receiver 12 are decoded at the front end decoder 41, and the ID code is taken out of the data. As the coincidence of this ID code with one of the registered ID codes in the system data table 43 is discriminated and its registration is thereby confirmed, the transmitted data of the particular ID code are provided to the transmission data discriminator 45 to be decoded. The control signal corresponding to the decoded data is provided as an output.

Provided that the system is employed in a call chime system as shown in FIG. 8, the control signal is conveyed to a phonic signal generating circuit 49 in a chime 48 and to a timer 50 and a phonic sign is produced by a speaker 51 with its tone varied as occasion demands. When, for example, the transmission data are formed by 3 bits DATA0 to DATA2, it is possible to prepare four different phonic call signs by actuating the phonic signal generating circuit 49 and speaker 51 with combinations of outputs at 1/0 ports PORT1 to PORT3 at the transmission data discriminator 45. That is, when the bit DATA0 of the transmission data decoded is "1", the discriminator 45 provides at the PORT1 an output of "1" and the timer 50 is activated upon rising of this output, so that the phonic call sign can be generated by the speaker 51 depending on the set time of the timer 50.

The bits of DATA1 and DATA2 are further discriminated optimally to define the outputs at the PORT2 and PORT3 so that different phonic call signs as desired are to be produced, whereas, when DATA0 is "0", the PORT outputs are reset so as to wait for next output provision from the front end decoder 41.

Figure 11:
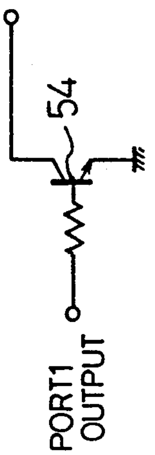
FIGS. 11 and 12 are circuit diagrams showing different output means in the wireless receiver of FIG. 8.
Figure 12:
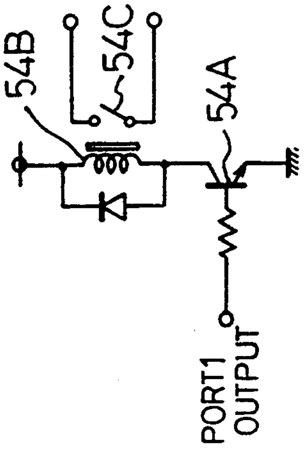
Figure 10:
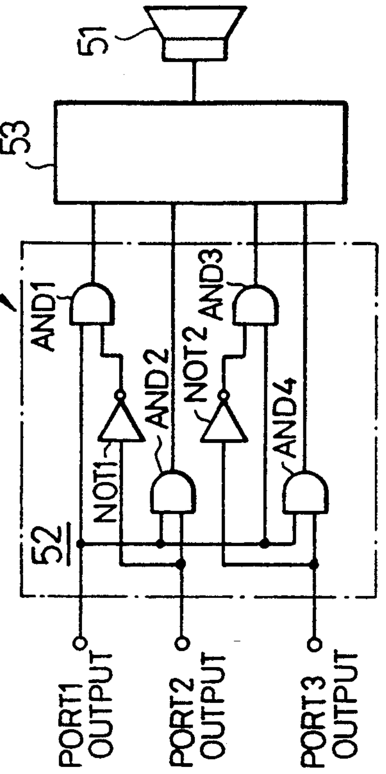
FIG. 10 shows a sound signal generating circuit in the wireless receiver of FIG. 8.

For the phonic signal generating circuit 49, it may be possible to employ an arrangement, as shown in FIG. 10. A 3:4 decoder 52 is formed by combining AND gates AND1 to AND3 and NOT gates NOT1 and NOT2 respectively arranged to receive the three port outputs PORT1 to PORT3 from the 1/0 ports of the discriminating means 45. A melody IC 53 receives four outputs from the decoder 52 to be thereby driven. As shown in FIG. 11, it may also be possible to add to the receiver, if required, means for transferring the sign to some other associated device. A transistor 54 is connected to the 1/0 port output terminal PORT1 of the discriminator 45 to utilize the open output. FIG. 12 shows a transistor 54A connected to the 1/0 port output terminal PORT1 and a relay coil 54B connected to the collector of the transistor 54A. A relay contact 54C is disposed to oppose the relay coil 54B to be thereby opened and closed.

Figure 13:
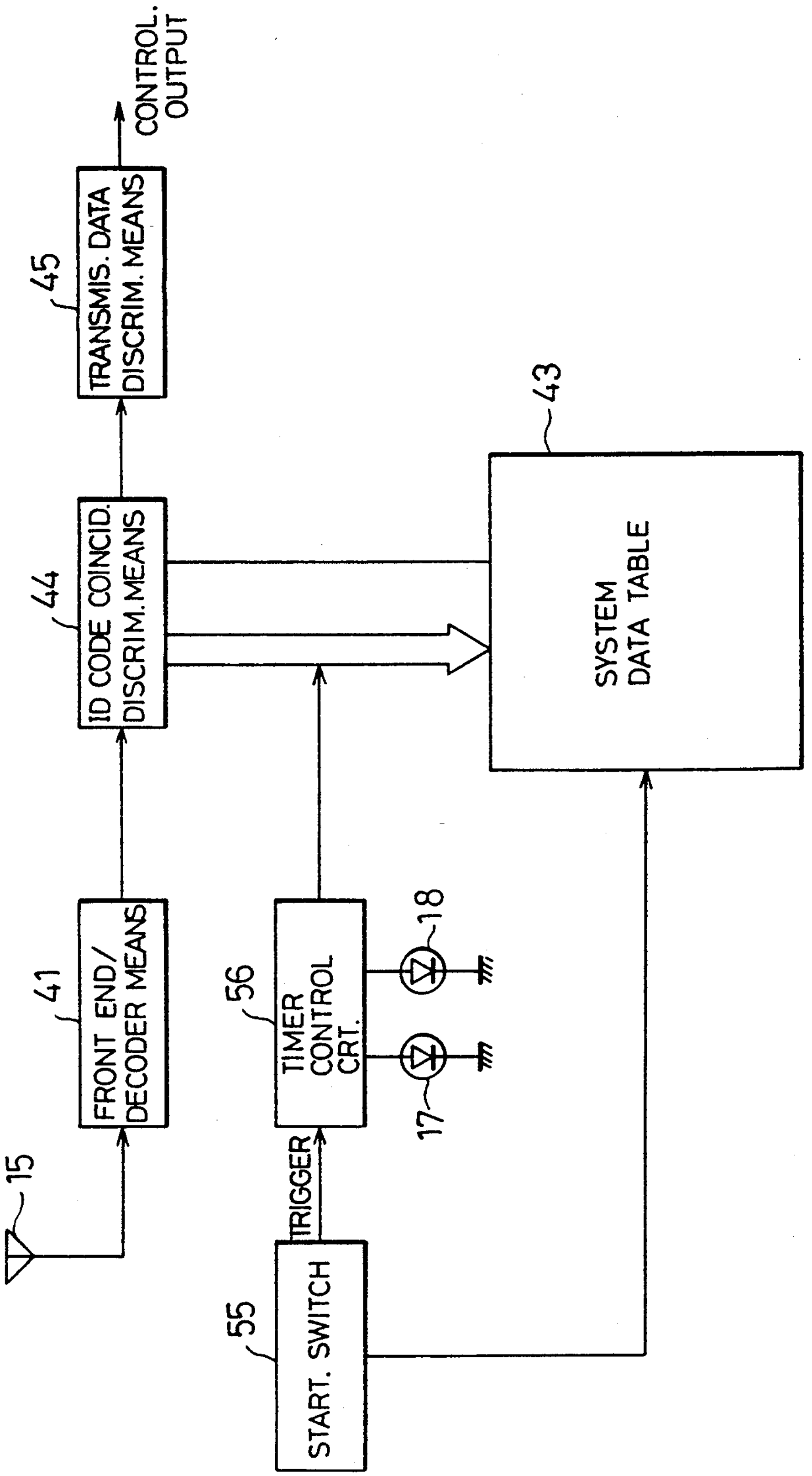
FIG. 13 is a block circuit diagram of the wireless receiver in another embodiment provided with an automatic mode switching means.

When the mode switch 42 is to be automatically actuated, the wireless receiver 12 should preferably be of the arrangement shown in FIG. 13. In an aspect shown in FIG. 13, the mode switch 42 in the basic arrangement of FIG. 7 comprises a start switch 55 and a timer control circuit 56. Transmitted data from one of the wireless transmitters will cause the start switch 55 to be actuated, as in the timing diagram of FIG. 15. The timer control circuit 56 is then started as triggered by the start switch 55, and the state of the registering mode is attained during a set time at this timer control circuit 56. Upon elapsing of this set time, the mode is automatically switched over to the normal mode (see also FIGS. 14 and 15).

In addition to the indicating lamp 17, if required, the operation indicating lamp 18 which is lighted upon receipt at the wireless receiver 12 of the transmitted data may be provided in the timer control circuit 56. While the wireless receiver 12 in the present aspect is to be operated in accordance with the flow-chart of FIG. 14, other arrangement and operation in the present instance are substantially the same as those in the receiver which has been disclosed with reference to FIG. 7 or 8 except for the automatic mode switch. The same constituents as those in the receiver of FIG. 7 or 8 are denoted by the same reference numerals.

Figure 15:
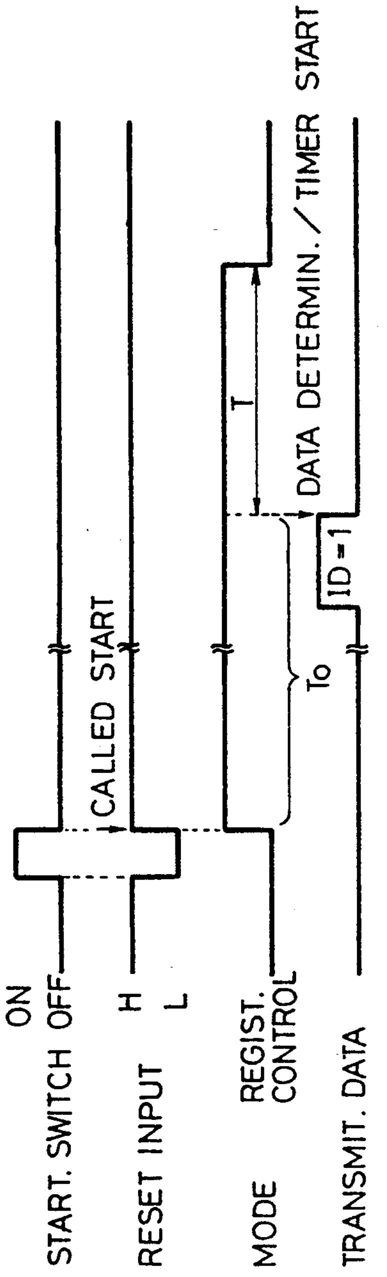
FIG. 15 is a timing diagram showing an operation sequence of the wireless receiver of FIG. 13.
Figure 17:
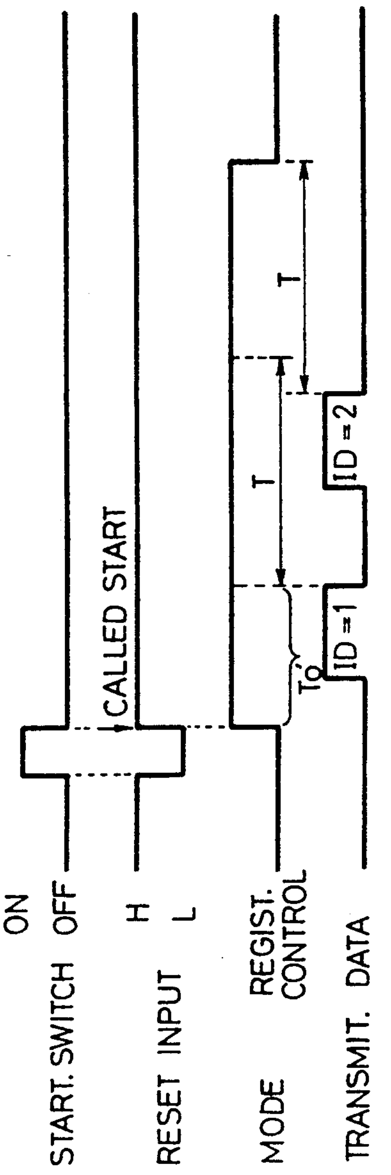
FIG. 17 is a timing diagram showing an operation sequence of the wireless receiver of FIG. 16.

In the respective foregoing embodiments or aspects, as will be clear in view of the time-chart of FIG. 15, their arrangements are of a so-called cold starting with all registered data in the data table 43 cleared always when the normal mode is switched over the registering mode. However, the arrangement may be made, if required, to maintain the already registered data without being cleared and further data registered sequentially. Further, the arrangement may be so made as to allow the registration to be reliably carried out even in an event where a delay is caused in the registering operation of the ID code by replacing the timer control retriggerable timer control circuit 56A as shown in FIG. 16, and extending the set time of the timer to have the registration carried out re-triggerably, as will be clear from comparing FIG. 17 with FIG. 15.

Figure 18:
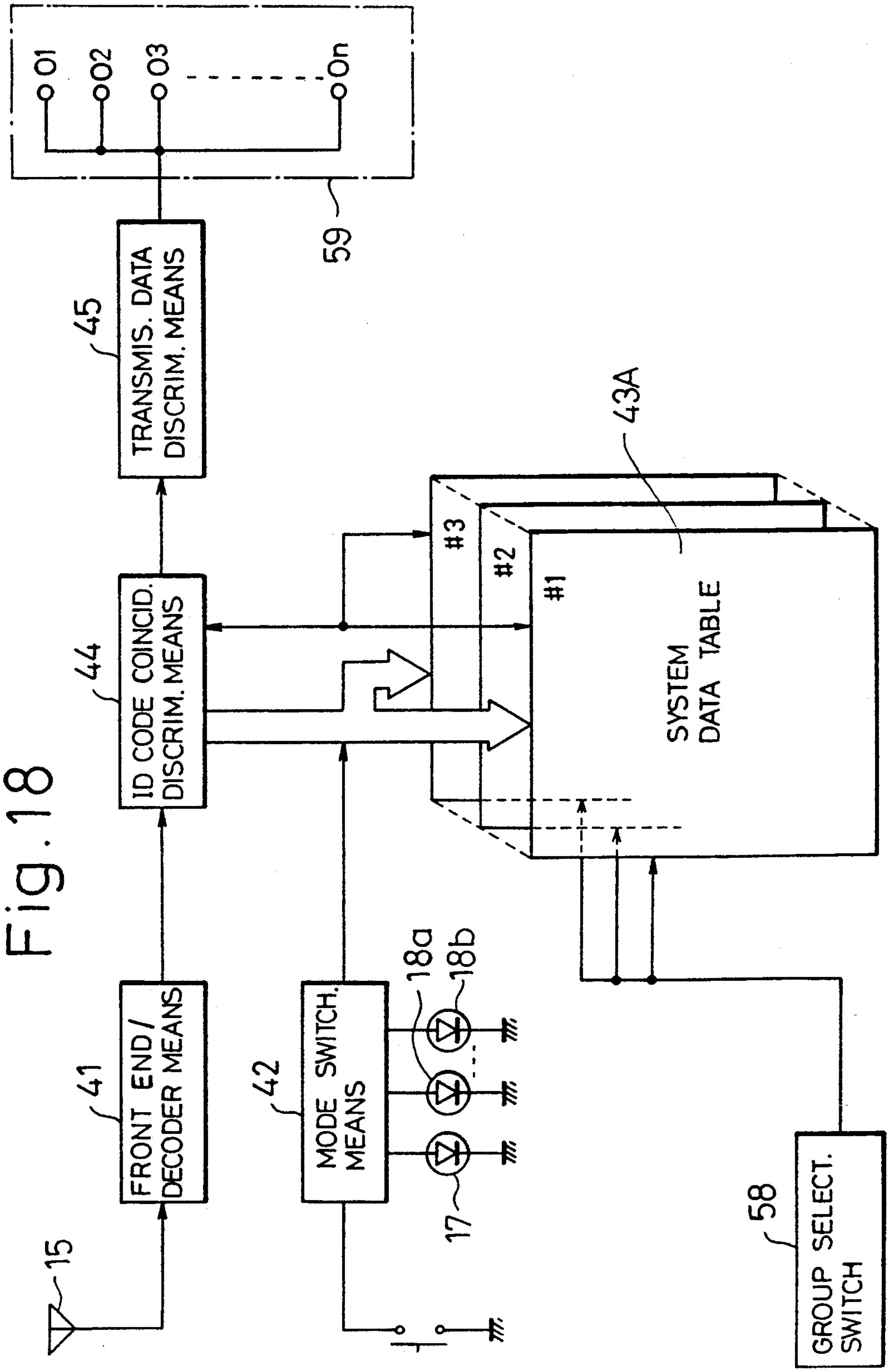
FIG. 18 is a block circuit diagram of the wireless receiver in a further embodiment provided with an automatic mode switching means.

In addition, the wireless receiver allows a plurality of ID codes to be registered for preliminarily set groups of the codes. In this case, as shown in FIG. 18, the system data table 43A is divided into a plurality of registering areas, and a group selecting switch 58 is connected to the table 43A so that one of the registering areas can be selected through this group selecting switch 58. Further in the present instance, a plurality of the operation indicating lamps 18*a* and 18*b* are connected to the mode switch 42 for indicating the operation with respect to each of the divided registering areas so that any one of the registering areas in which the codes are being registered may be visually confirmed, and the discriminator 45 is provided with an output terminal 59 having divided terminals 01 to On corresponding to the divided registering areas to obtain the control outputs in correspondence to the respective registering areas. According to the receiver arrangement of FIG. 18, a plurality of objects to be controlled may be controlled as divided into groups by means of the single wireless receiver. In the case of forming, for example, a wireless security system, a plurality of objects can be monitored for each of divided groups of the objects. When a wireless chime system is formed, a plurality of the phonic call signs made mutually different for each of the divided object groups may be generated.

Figure 14:
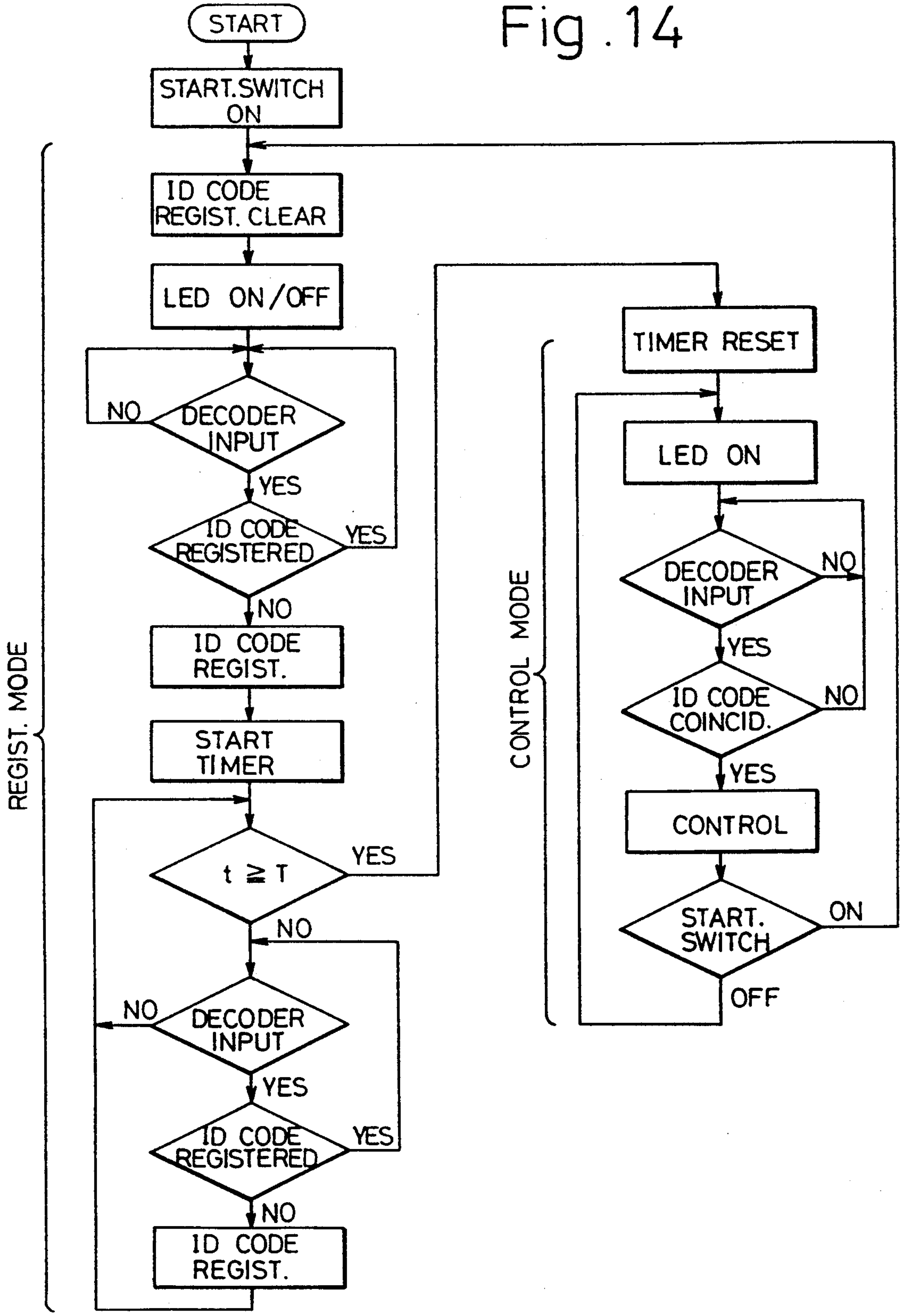
FIG. 14 is an operation flow-chart of the wireless receiver of FIG. 13.
Figure 16:
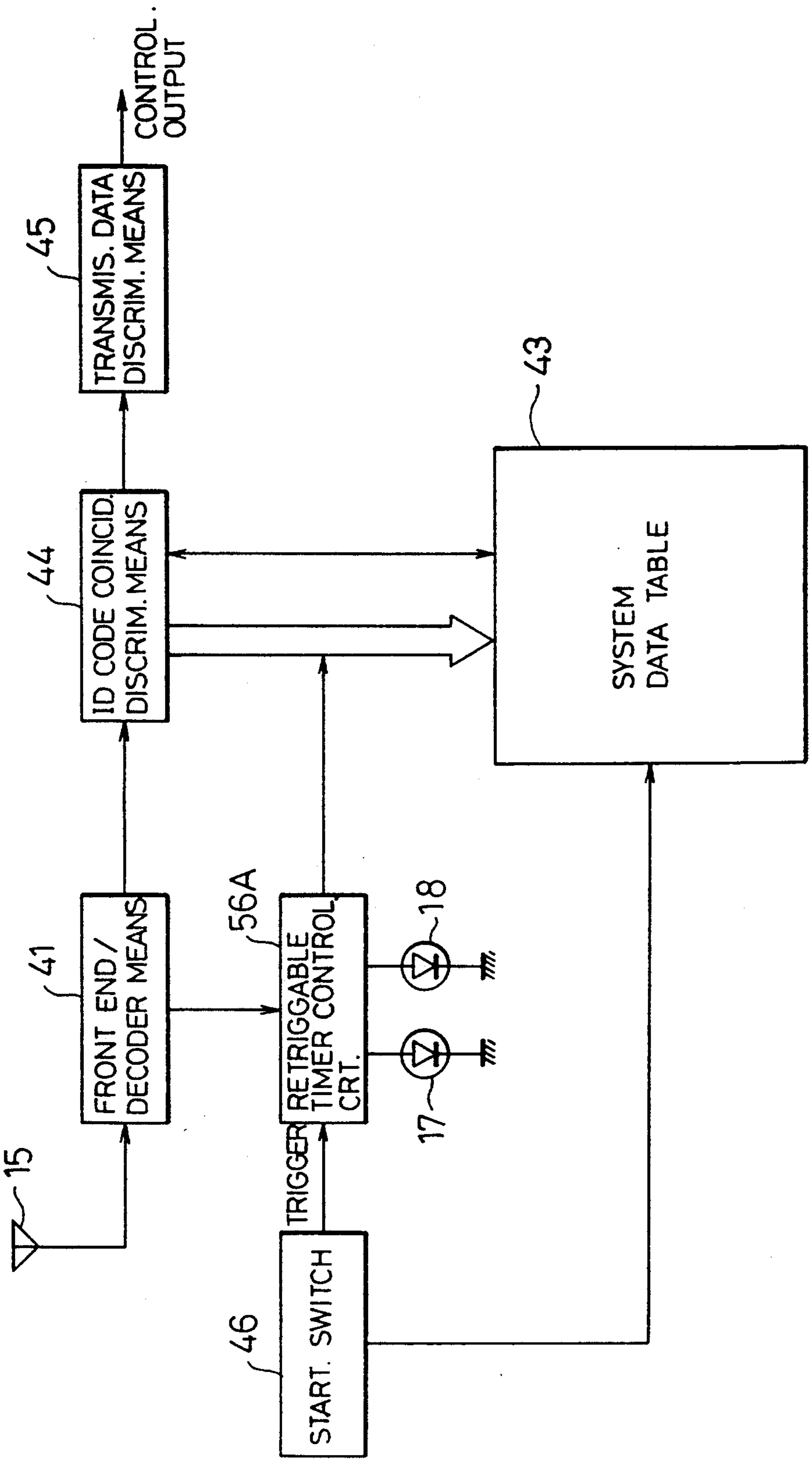
FIG. 16 is a block circuit diagram of the wireless receiver in still another embodiment provided with an automatic mode switching means.

While the wireless receiver 12 of FIG. 18 is arranged for mode switching by means of a manual switch in the same manner as in the receiver of FIG. 8, the arrangement can be modified as required into automatic mode switching with start switch and timer control circuits such as in FIG. 14, or into an automatic mode switching arrangement as in FIG. 16 where the re-triggerable operation is carried out by means of a re-triggerable timer control circuit.

Figure 19:
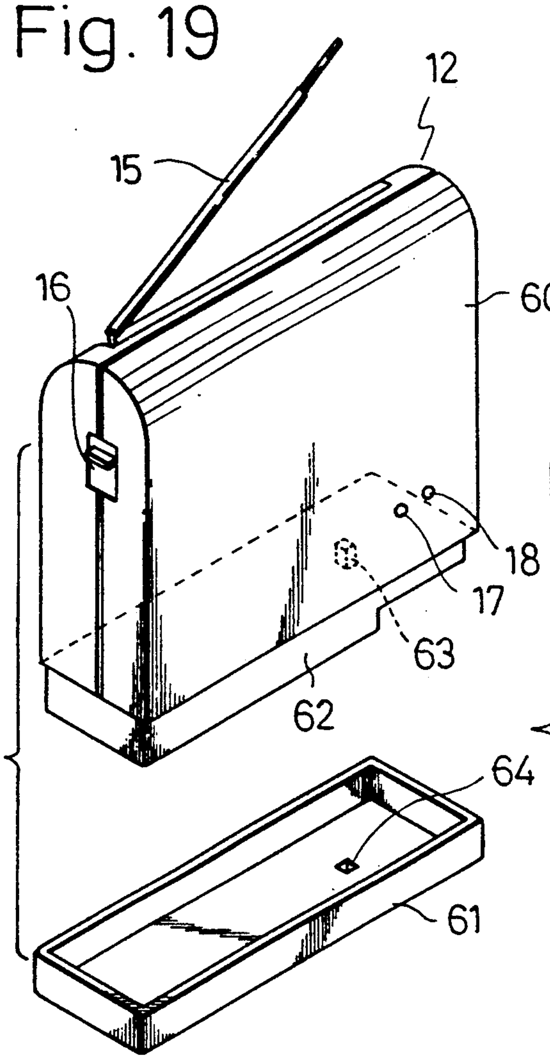
FIG. 19 is a perspective view as disassembled of a wireless receiver according to the invention provided with an automatic mode switching means having a start switch.
Figure 20:
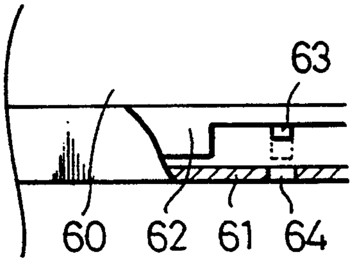
FIG. 20 is a fragmentary sectioned view at a portion of the receiver of FIG. 19.
Figure 22:
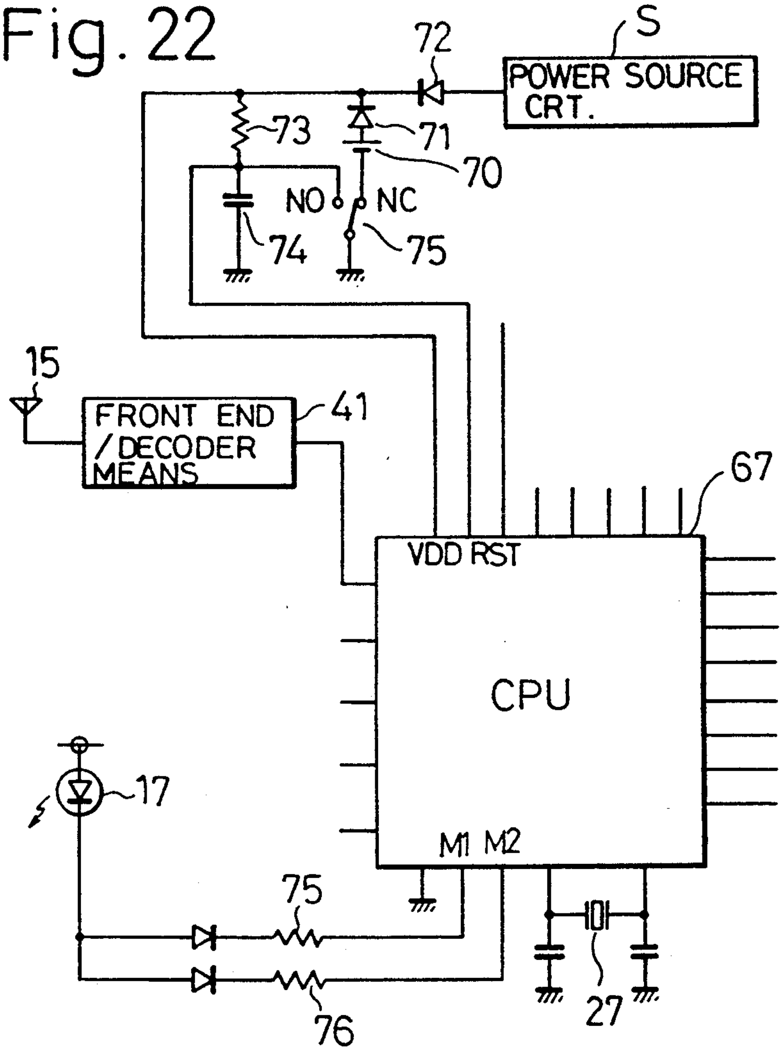
FIG. 22 is a block circuit diagram in an embodiment of the automatic mode switching means employed in the wireless receiver of FIG. 21.

For a start switch operably coupled to the mode switch 42, such arrangement as shown in FIGS. 19 and 20 can be utilized. A body casing 60 of the wireless receiver 12 comprises a bottom cover 61 securable to the casing 60 by means of screws not shown, at a stepped bottom part 62 of the casing 60. A movable member 63 of the start switch that renders the switch turned on in a projected state under a spring load is provided to project out of a lower surface of the bottom part 62. At a portion of the bottom cover 61 opposing the movable member 63, an operating hole 64 is provided through the cover for allowing the movable member 63 to be operated from the exterior by means of a proper jig passed through the hole 64 in a state where the bottom-cover 61 is secured to the casing 60. With this arrangement, a user can turn on the start switch by placing the movable member 63 of the start switch into a projected state as shown by broken lines in FIG. 20 by means of the jig even when the bottom cover 61 is fixedly secured to the body casing 60. This start switch, actuatable without requiring the bottom cover 61 to be detached, allows the receiver to be sold incorporating a back-up cell for the system data table in the receiver. Required user labor can be simplified.

Figure 21:
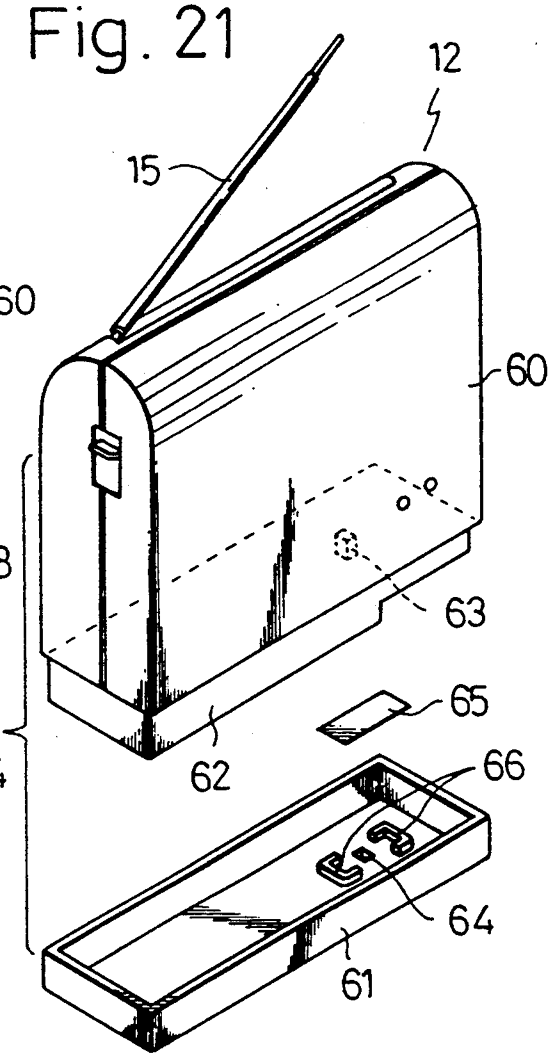
FIG. 21 is a perspective view as disassembled of a wireless receiver according to the invention provided with an automatic mode switching means having a start switch.

To prevent the start switch from being accidentally turned on, the bottom cover must be detached. However, the prevention of such accidental turning on of the start switch can be reliably achieved by the arrangement shown in FIG. 21, in which an "off" plate 65 is provided on an inner surface of the bottom cover 61 held by supports 66 enclosing the operating hole 64. The off plate 65 urges the movable member 63 into its retracted position, and the start switch can be reliably prevented from being put into "on" state even when an impact is given to the wireless receiver 12. When the start switch is to be actuated, the bottom cover 61 is detached to remove the "off" plate 65, and the movable member 63 may be placed into the projected "on" state. The arrangement should preferably be also so made that, after the mounting of the bottom cover 61, the start switch can be turned off by restoring the acted state of the movable member 63 by the jig inserted through the hole 64.

For the start switch, further, it is preferable to adopt such a circuit arrangement as shown in FIG. 2 in which a switch 75 is connected at its normally closed terminal NC to a minus side terminal of a back-up cell 70 and at normally opened terminal NO to a reset terminal RST of a CPU 67 forming a main element of the circuit, while a plus side terminal of the back-up cell 70 is connected to the anode of a diode 71, the cathode of which is connected to the cathode of another diode 72 connected at the anode to an external power source S, and a junction between the cathodes of both diodes 71 and 72 is connected to a VDD terminal of the CPU 67. A resistor 73 is connected across the junction between both diodes 71 and 72 and a junction between the normally opened terminal NO and the reset terminal RST, and a capacitor 74 is connected across the junction between the terminals NO and RST and the ground. As the start switch 75 is turned from the NC terminal side to the NO terminal side, the reset terminal RST of the CPU 67 will be at a voltage level of L, a reset signal is thus provided thereto, and the receiver 12 is held in the reset state. As the start switch 75 is turned back to the NC terminal side, a back-up power source voltage is caused to be applied to the VDD terminal even in a state where the external power source S is not connected. In an event where the external power source S is connected, a series circuit of the resistor 73 and capacitor 74 acts to render the diode 71 to be in "off" state, and the voltage of the back-uP Power source 70 is not applied to the CPU.

Figure 23:
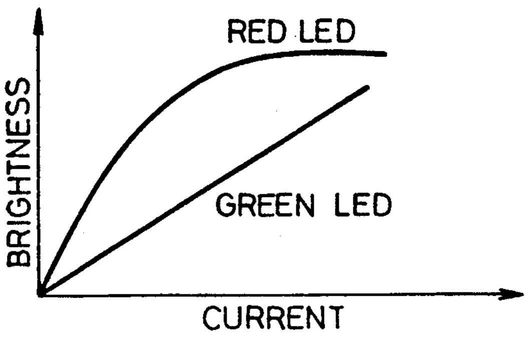
FIG. 23 is a diagram showing the brightness with respect to electric current of red and green LEDS employed in the wireless receiver of FIG. 21.

A lighting control arrangement for the mode indicating lamp 17 is formed by connecting the lamp 17 to a control mode output terminal M1 and a registration mode output terminal M2 of the CPU 67 through two series circuits of a diode and a resistor connected in parallel. In the present instance, the resistor 76 in the series circuit connected to the output terminal M2 is set to be of a value smaller than the resistor 76' in the series circuit connected to the CPU output terminal M1. When the wireless receiver 12 is switched into the registering mode, an "L" level pulse signal is provided out of the registering mode output terminal M2 to have the indicating lamp 17 lighted. Since the resistance values of both resistors 76' and 76 are made to be mutually so different that the lamp 17 is lighted by a relatively larger current during the registering mode, the indication of the particular registering mode can be visually confirmed easily. For the indicating lamp 17, therefore, it is preferable to employ a green color lamp, since the brightness of a green color light varies more linearly with current than, for example, red color light as seen in FIG. 23.

Figure 24:
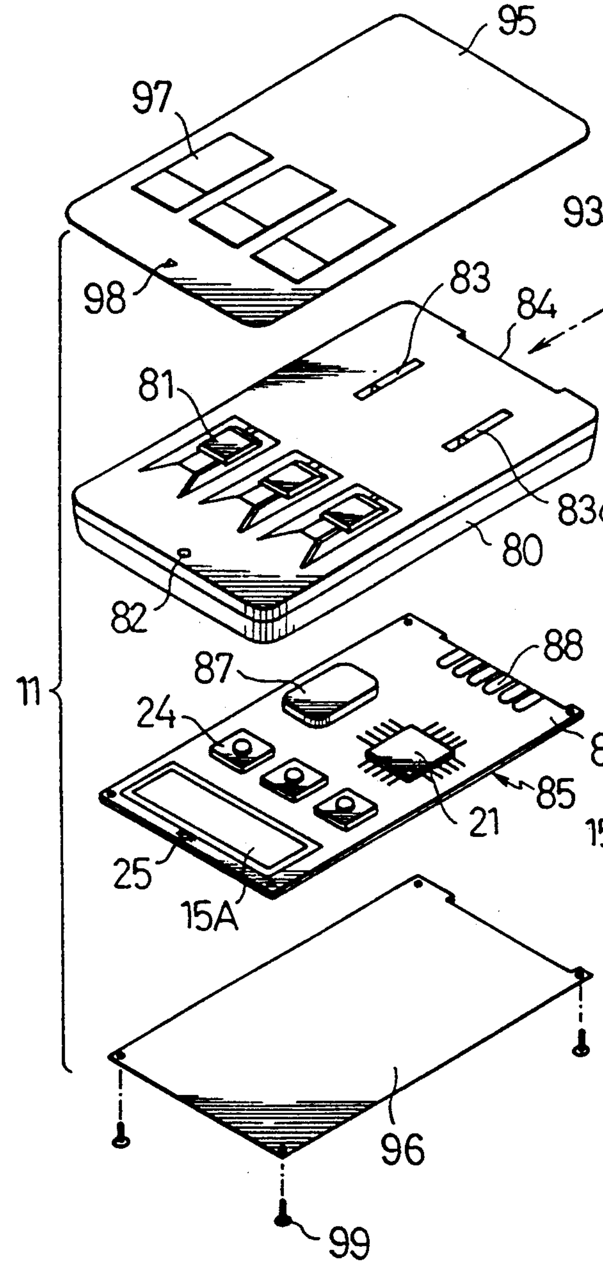
FIG. 24 is an exploded perspective view of a wireless transmitter in another card-type embodiment.
Figure 25:
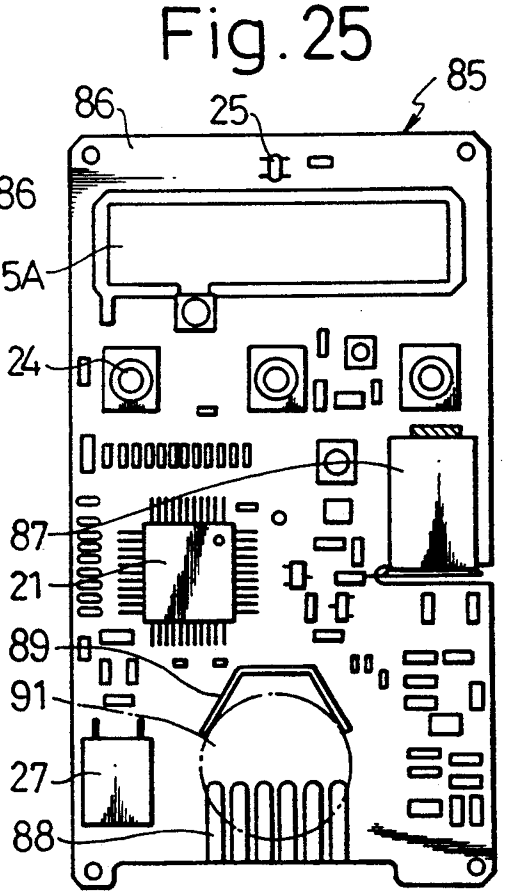
FIG 25 shows in a plan view a control circuit plate in the wireless transmitter of FIG. 24.

According to another feature of the present invention, the wireless transmitter 11 can be made to be thin. Referring to FIGS. 24 and 25, the transmitter 11 comprises a thin card-type hollow casing 80, which includes a plurality of inwardly depressible key-top members 81 having cantilever type cut out members, a light permeating hole 82 made in the center of a front part adjacent front end side edge, inward projected locking arms 83 and 83a provided in a rear part, and a seating part 84 made in the center of a rear end side edge for seating a cell holder 90 (described below). A control circuit board 85 is provided within the casing 80, and this circuit board 85 carries a loop-shaped antenna 15A formed on a front part of the board in a conductor pattern, a plurality of switches 24 at a next stage portion of the front part for allowing the key-top members 81 of the casing 80 to be resiliently brought into contact with the switches 24, the CPU 21 in a rear part next to the switches 24, a reference frequency generator 87 for a transmission circuit provided in the rear part and next to the switches 24, and a reference clock generator 27 comprising a quartz oscillator disposed in rear part of the board 85, while an indicating lamp 25 is provided in the center of the front part adjacent the front end side edge, and a conductor 88 is provided along the rear end side for connection of the power source.

The cell holder 90 to be fitted in the seating part 84 of the casing 80 is formed to have a cell supporter 92 for receiving a coin-shaped circular cell 91 and locking arms 93 and 93a at extended ends of the supporter 92 for lockingly engaging with the rocking arms 83 and 83a of the casing 80 when the holder 90 is mounted to the casing 80, so that the cell holder 90 as well as the cell 91 will be held at a predetermined position. When the cell holder 90 is mounted to the casing 80, further, an upper side "plus" electrode of the cell 91 is brought into contact with a projected conductor 89 while a lower side "minus" electrode of the cell 91 comes into contact through a comb-teeth contactor 94 with the part 88 for supplying power to the CPU 21, the reference frequency generator 87, and so on. On upper and lower surfaces of the casing 80, name-plate seals 95 and 96 are provided on which an article number, usage instructions, and the like are printed and bonded, while the upper side seal 95 carries depression instruction prints 97 at positions opposing the key-top members 81 of the casing 80 and a light permeating part 98 formed in the center of front side end portion of the seal 95 to align with the lamp 25 of the circuit board 85 and the light permeating hole 82 of the casing 80. These control circuit board 85, casing 80, and seals 95 and 96 may preferably be joined integrally by means of screws 99.

Figure 26:
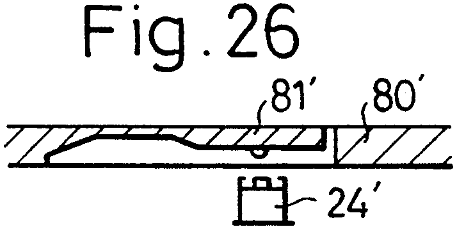
FIGS. 26 and 27 and FIGS. 28 and 29 are respectively explanatory views for detailed operation in two different manners of a key top member in the wireless transmitter of FIG. 24.
Figure 28:
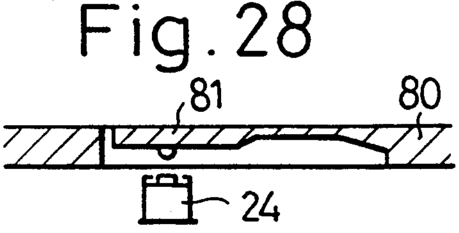
Figure 27:
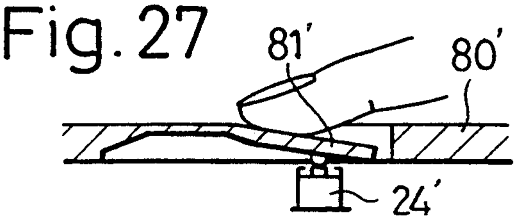
Figure 29:
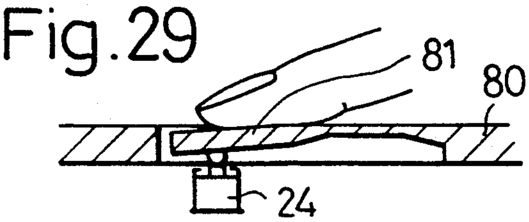

Therefore, when one of the key-top members 81 is depressed through the top seal 95, a corresponding one of the switches 24 is turned on, the transmission circuit including the CPU 21 is thereby driven, and the transmission data including the ID code referred to above are transmitted through the antenna 15A, and this operating state is indicated by the lamp 25. In this case, as will be clear when FIGS. 26 and 27 are compared with FIGS. 28 and 29, the key-top members 81 are depressed not by a body portion of a finger but rather by a tip end portion of the finger, such that when a key-top member 81' of a casing 80, is depressed from non-actuated state of FIG. 26 into an actuated state of FIG. 27 with a body portion of a finger, the key-top member 81' made thin at a base portion for easy depression can be bent down to engage the switch 24', but the depression made by the finger body portion is likely to cause a depressing stroke of the key-top member 81' to be relatively larger. In contrast, the depression by the finger tip from the non-actuated state of FIG. 28 to the actuated state of FIG. 29 of the key-top member 81 renders the depressing stroke to be relatively smaller.

Such smaller depressing stroke of the key-top members 81 is contributive to a realization of the thin card-type wireless transmitters 11 in combination with such features that the planar loop-shaped antenna 15A is employed in the wireless transmitters, the ID code setting for the respective transmitters can be made preliminarily by the manufacturer to render any connecting member for connecting work by the user to be unnecessary, the key-top member is made thin at its base portion to render the member elastically bendable and restorable without requiring any separate return spring, and so on. Further, the antenna 15A is disposed so as not to be covered the user's hand upon depression of the key-top members 81, and the radio wave radiation efficiency of the antenna 15A is not reduced.

Figure 30:
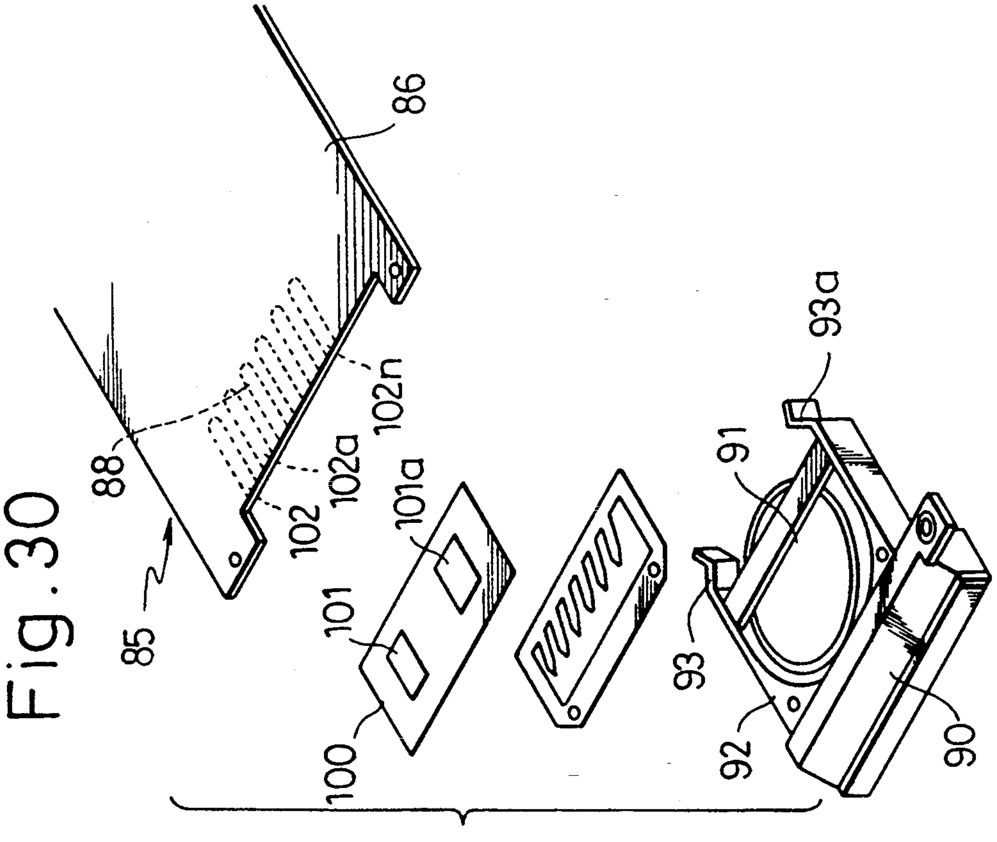
FIG. 30 is a perspective view as disassembled of a portion of the wireless transmitter in another embodiment as applied to a wireless chime.

In FIG. 30, there is shown another arrangement suitable for applying the wireless transmitter 11 to a wireless chime system in which the control circuit board 85 in the transmitter of FIG. 24 is made to include an insulating seal 100 having a plurality of apertures 101 and 101a interposed between the conductor part 88 and the comb-teeth contactor 94. Here, the conductor part 88 is so provided that, in the same manner as in the case of setting the mutually different ID codes in the foregoing embodiments, some of a plurality of branch conductors 102, 102a . . . 102n brought into contact with the minus electrode of the cell 91 in different pattern will cause a set of transmission data appointing different chime sounds towards the wireless receiver 12, and the provision of such switches 24 that are required for the tone pattern modification in the case of FIG. 2 but increase the thickness of the transmitter can be eliminated. Now, the insulating seal 100 is prepared to have the apertures 101 and 101a at different positions or in different sizes from other seals for all other transmitters, different ones only of the branch conductors 102, 102a . . . 102n forming the conductor 88 can be brought into contact with the minus electrode of the cell 91 through some of the teeth of the contactor 94 not covered by the insulating seal 100.

Figure 31:
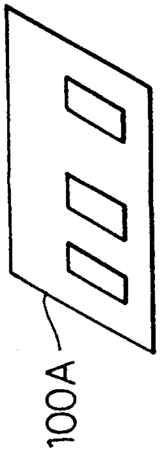
FIGS. 31 to 33 are explanatory views for examples of arrangement of insulating seals setting tone pattern in the wireless transmitter of FIG. 30.
Figure 32:
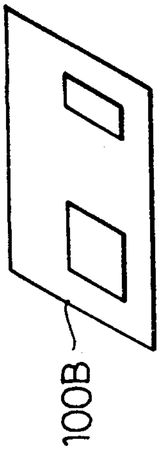
Figure 33:
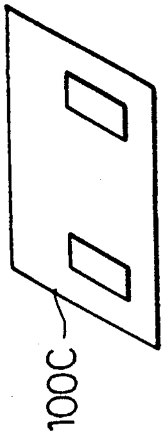

More specifically, as shown in FIG. 31, for example, the insulating seal 100A is provided with the apertures allowing first, third, and sixth teeth of the contactor 94 to contact with the cell 91 so that a sound of such sequential tone of marimba will be produced. Another insulating seal 100B of FIG. 32 having apertures allowing first, second, and sixth teeth of the contactor 94 to contact with the cell 91 produces an intermittent sound tone of the marimba, whereas still another insulating seal 100C of FIG. 33 having apertures which allow first and sixth teeth of the contactor 94 to contact with the cell 91 is to produce an ordinary buzzer sound. Other arrangements in the wireless transmitter shown in FIG. 30 are substantially the same as those in the transmitter shown in FIGS. 24 and 25, and the same constituents in the transmitter of FIG. 30 as those in FIGS. 24 and 25 are denoted by the same reference numerals.

Figure 34:
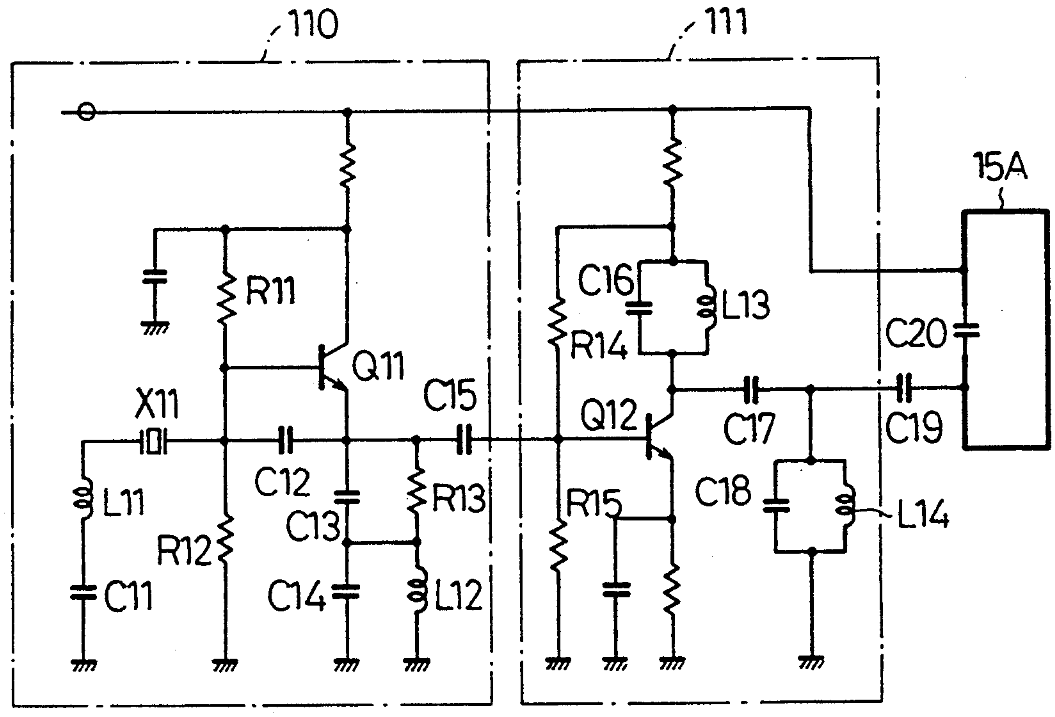
FIG. 34 shows an oscillation circuit included in a wireless transmitting means in the wireless transmitter of FIG. 30.

For the wireless transmitting means 22 of the wireless transmitter 11, it is preferable to employ such circuit arrangement as shown in FIG. 34. Thus, the wireless transmitting means 22 comprises an oscillation circuit 110 and a frequency multiplier 111, to the latter of which the loop shaped antenna 15A is connected. The oscillation circuit 110 is formed to oscillate at a frequency determined by a crystal oscillator X11, coil L11, and capacitor C11, the oscillation of which is stabilized by means of a positive feedback amount determined by a capacitor C12 and a negative feedback amount determined by capacitors C13 and C14 and a coil L12. The oscillation circuit 110 includes a transistor Q11 for the crystalline oscillation, as DC biased by resistors R11 and R12 and with a negative feedback applied by a resistor R13.

An output of the oscillation circuit 110 is applied through a capacitor C15 to a transistor Q12 biased by resistors R14 and A15 in the frequency multiplier 111. A higher harmonic of frequencies provided by a resonance circuit formed by a coil L13 and a capacitor C16 is selectively amplified to be provided through capacitors C17 and C19 to the loop antenna 15A and radiated thereout as a radio wave signal. The amplified higher harmonic is synchronized with a predetermined oscillation frequency by means of a parallel oscillation circuit of a capacitor C18 and a coil L14 so as to be of a low impedance with respect to other frequencies and to perform a filtration for removing any disturbing wave. The loop antenna 15A includes a capacitor C20 for improving the antenna radiation efficiency together with inductance component of the antenna 15A.

Figure 35:
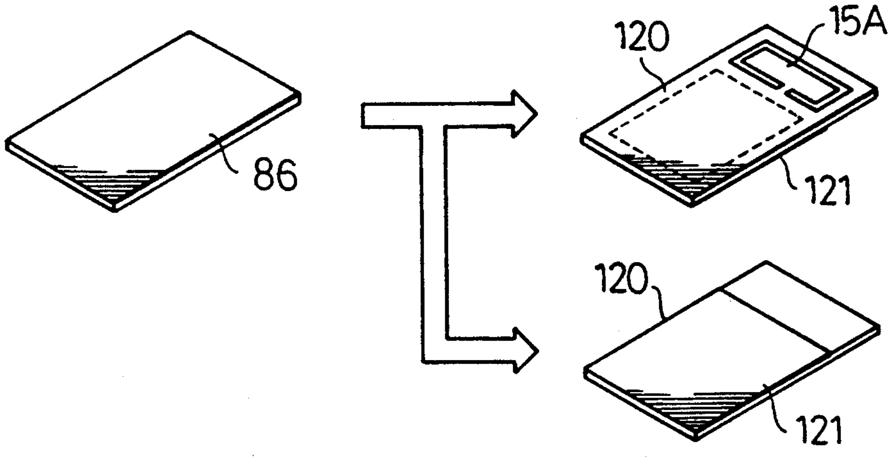
FIG. 35 is a diagram showing schematically manufacturing steps for a conducting shield plate employed in transmitter of FIG. 30.

In providing to one surface of a circuit-board substrate 86 a circuit pattern 120 including such wireless transmitting means 22 as in the above, it is desirable to provide a conducting shield 121 on the other surface of the substrate except for a portion corresponding to the loop antenna 15A, as will be seen in FIG. 35 showing both surfaces of the substrate 86. With this provision of the conducting shield 121, a magnetic field which acts to prevent any eddy current induced within the conducting plate due to a magnetic field produced by high frequencies from the oscillation circuit, and consequently any interference of disturbing waves, can be removed. In this case, it is possible to employ a both-surface copper clad laminate as the circuit substrate to form the circuit pattern including the antenna 15A with copper layer on one surface of the laminate, and to form the conducting shield with copper layer on the other surface of the laminate while removing part of the copper layer corresponding to the antenna 15A.

Figure 36:
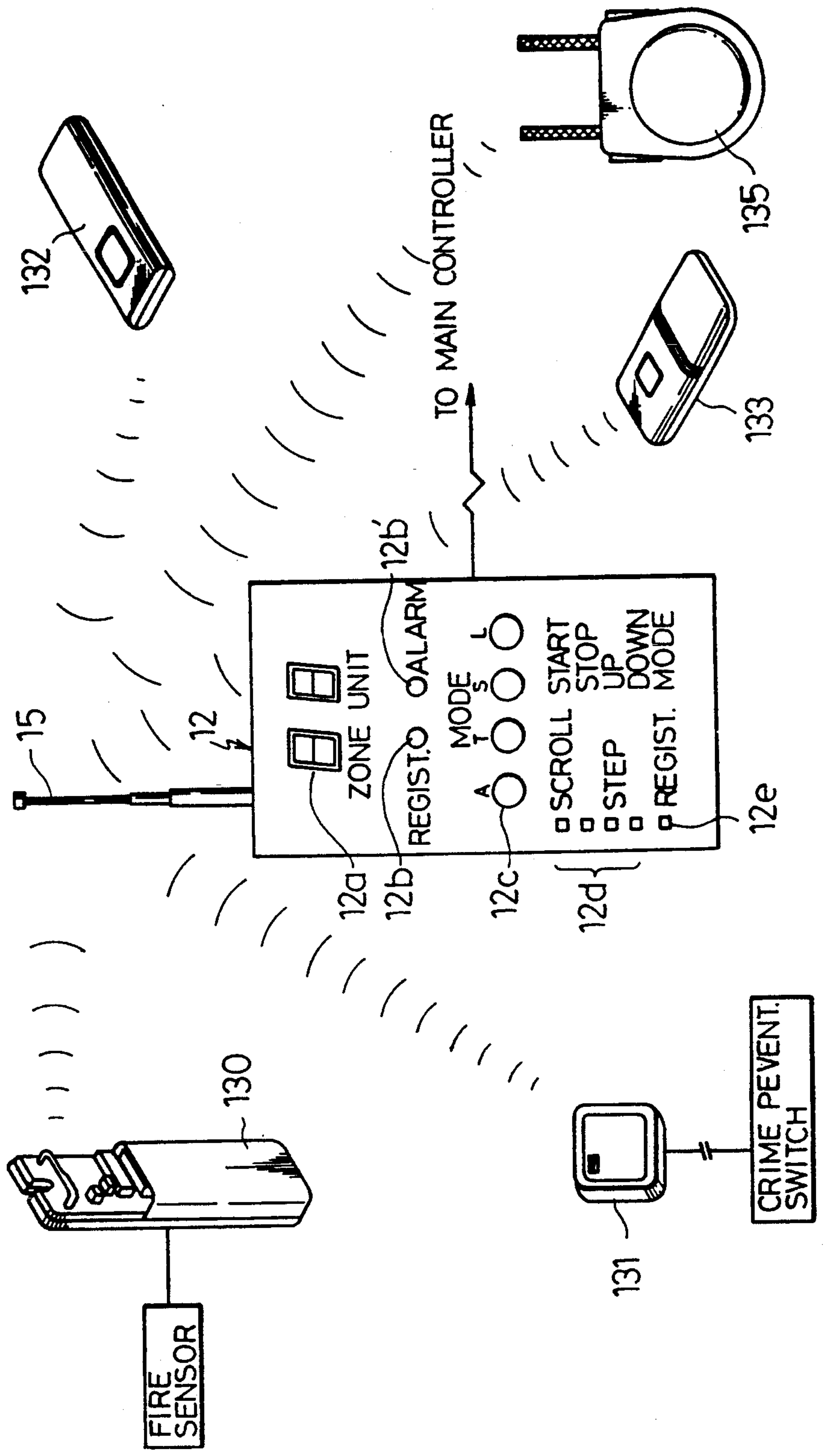
FIG. 36 is a diagram for explaining a general operation in an event where the system according to the present invention is employed in a security system.

The wireless transmission-reception control system according to the present invention can be utilized in a security system such as shown in FIG. 36. The wireless transmitters 11 may transmit various security signals as the transmission data and may comprise a transmitter 130 that generates transmission data relative to a fire alarm in association with a fire sensor, a transmitter 131 that provides monitoring data of opened/closed state detection signal, or the like, as to windows and doors in association with crime prevention switches, or transmitters 132–134 that are to be carried by aged persons, patients, and so on hung on their necks for generating emergency signals. The transmission data from these transmitters are transmitted towards the wireless receiver 12 as driven by a driving member of the fire sensor, crime prevention switch, or the like or by a manual depression of the call switch 13 of the transmitters. While the interior arrangement of the wireless receiver 12 is as has been disclosed above, its front body face carries, or example, an area-code indicator **12*a*, a mode state indicator 12*b*, a security-information indicator 12*c*, control switches 12*d*, and a registering mode switch 12*e*. The transmission data from the security system are also the same in the basic structure or format as in the case of the ID code referred to above with reference to FIG. 6**, but they may be such that a pre-receive signal TP is provided at the top of each of the two frame data divided by, (or example, a pause Tk. The frames may be respectively formed by such security data S5-S0 disposed next to the ID code as alarming signal, dead-cell warning signal, and crime preventing signal, function codes El and E0 disposed at next stage, and odd number parity check code P at the last stage.

The system may be so arranged that the transmission data are transmitted continuously periodically as normal information and an abnormality is confirmed when the transmission of the normal information is interrupted.

Figure 38:
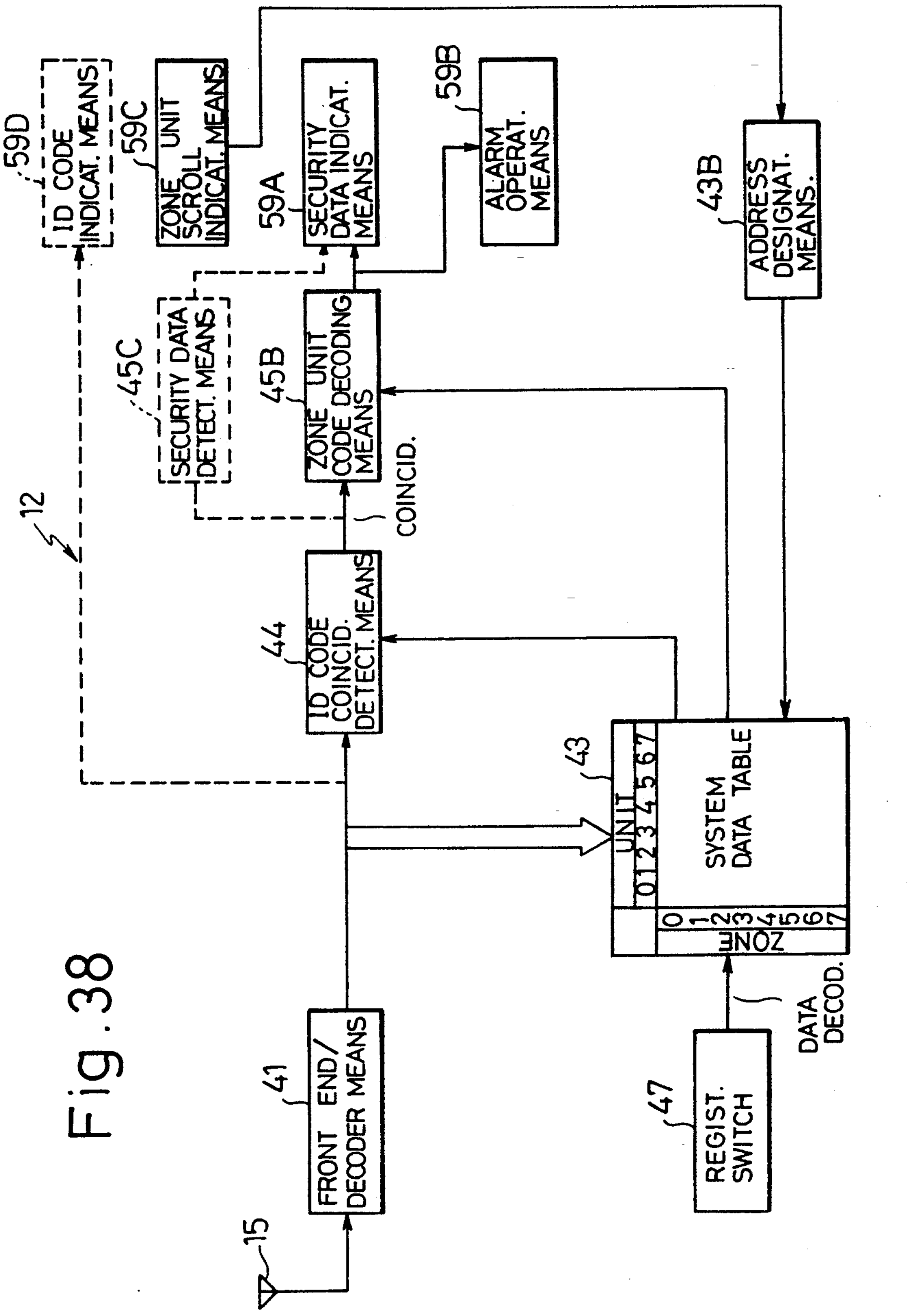
FIG. 38 shows in a block circuit diagram the wireless receiver in the system of FIG. 36.

In FIG. 38, there is shown a block circuit of the wireless receiver of the present invention when the same is applied to the foregoing security system, the basic arrangement of which is the same as that in the foregoing embodiments of FIGS. 7 and 8 and so on, and the same constituents are denoted by the same reference numerals. In the present instance, there is provided a decoder 45B for decoding outputs of the ID code coincidence detector 44 into a zone unit code, and the security data contained in output security signal of the zone unit code decoder 45B is to be indicated at a security information indicator 59A, while the output of the decoder 45B is provided to an alarm 59B to have such proper alarm means as a buzzer, siren, or the like actuated. When the security signal from the ID code coincidence discriminator 45 includes a plurality of data, it is preferable to incorporate a discriminator 45C for discriminating the type of the security data so that an output discrimination signal will be provided from the discriminator 45C to the security information indicator 59A. In the receiver 12, there is provided an indicator 59C for scroll-indicating and controlling the watching zone code which denotes a monitoring zone assigned to the respective wireless transmitters as well as the unit code. An output of the scroll indicator 59C is provided to an address designator 43B and an address designating signal is provided from this address designator 43B to the system data table 43. The receiver 12 may also be designed to provide an output of the front end decoder 41 directly to an ID code indicator 59D to have the ID code displayed prior to the discrimination of its coincidence or non-coincidence.

When, in the foregoing arrangement of the wireless receiver 12 of FIGS. 36 and 38, the control switches 12*d* in the front operating face are operated for the respective indications, the zone unit scroll indicator 59C is actuated. As the security signal is provided from one of the wireless transmitters 11 while the zone and unit are indicated at the indicator 12*a*, the particular zone and unit codes being indicated at the moment are assigned to the ID code of the security signal received and are registered. The system data table 43 may be provided, as will be clear when FIG. 39 is also referred to, for registering 64 different ID codes with divisions of, for example, 8 zones and 8 units, together with other data.

Figure 40:
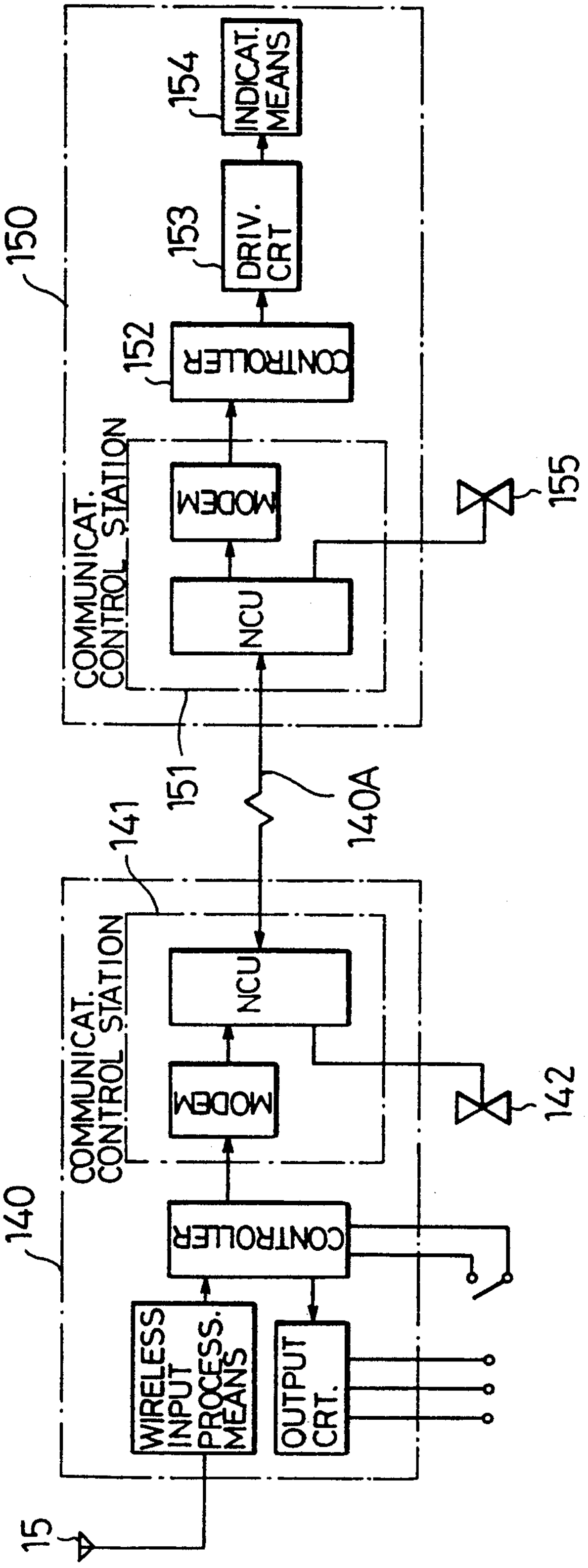
FIG. 40 is a block diagram showing a transmission communication system including the system of FIG. 36 and utilizing telephone lines.
Figure 37:
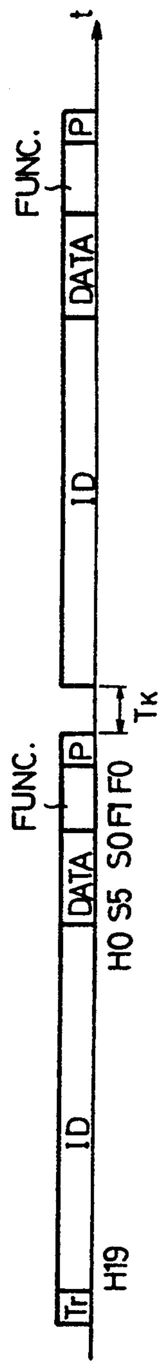
FIG. 37 is a format showing a security signal employed in the system of FIG. 36.

The wireless transmission-reception control system according to the present invention can be employed as a transmission communication system utilizing telephone office line 140A as shown in FIG. 40. A communication transmitter 140 in which the wireless receiver 12 is included incorporates therein a communication control station 141 which transmits through the telephone line 140A the output of the receiver 12. A communication receiver 150 to which the information from the transmitter 140 is provided comprises a communication control station 151 which receives the output from the communication control station 141 in the transmitter 140, so that a communication can be achieved between the both communication control stations 141 and 151 respectively through telephone sets 142 and 155. The communication control stations 141 and 151 comprise respectively a MODEM and an NCU, by the latter of which the stations are connected and disconnected automatically with the telephone line 140A in a manner known per se. An output of the MODEM on the side of the communication receiver 150 is provided through a controller 152 and a driving circuit 153 to an indicator 154, so that the transmission data from the wireless transmitter 11 and decoded by the wireless receiver 12 on the side of the communication transmitter 140 can be displayed on the indicator 154 at a further remote place than the receiver. It is possible, therefore, to establish the data transmission beyond the transmission-reception zone between the wireless transmitters 11 and the wireless receiver 12. With the foregoing automatic mode switching arrangement employed here, it is possible to automatically transmit the data to the indicator 154 installed at a remote position.

Figures 39, 41:
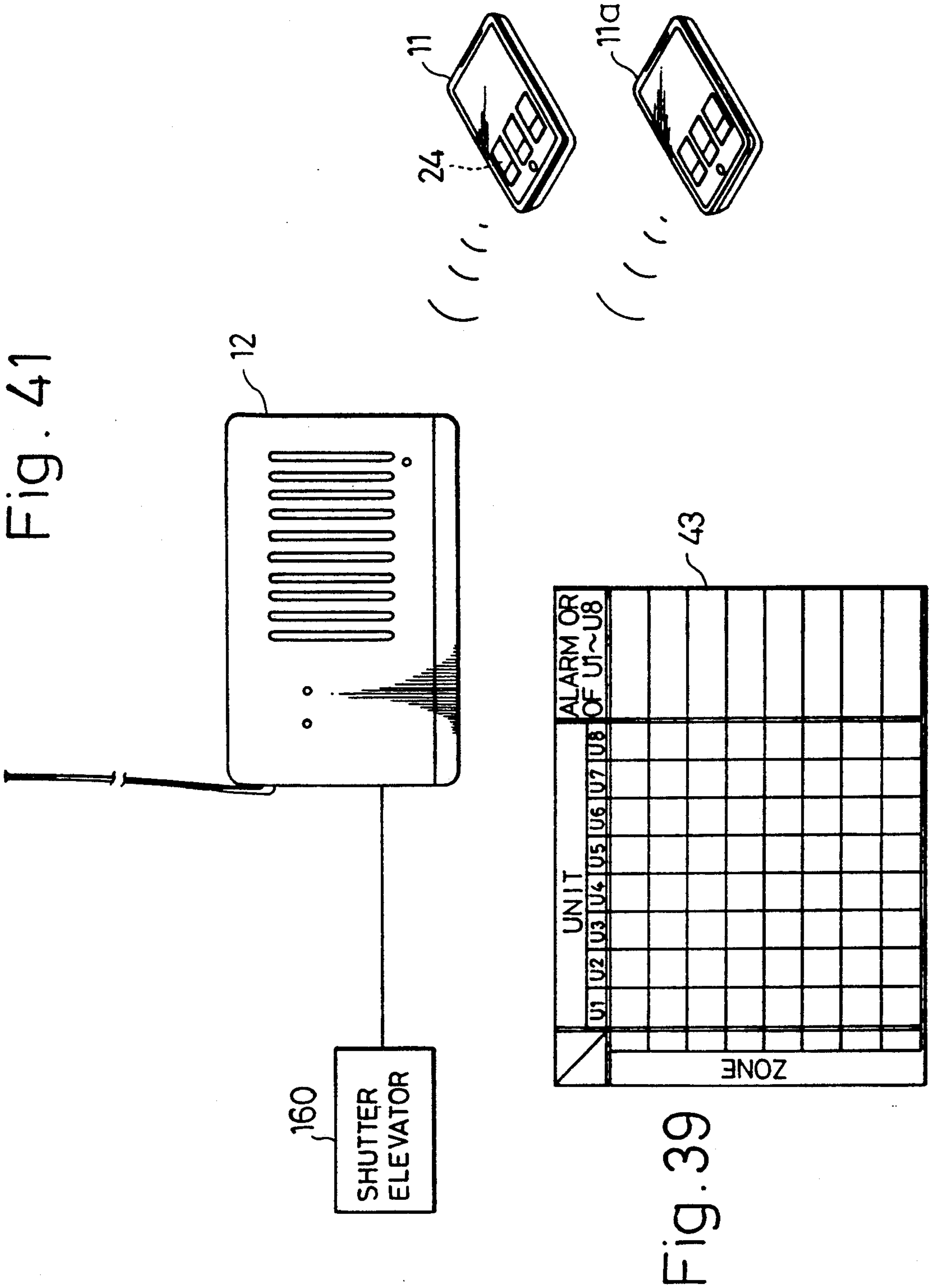
FIG. 39 is an explanatory view for a data registering means in an embodiment employed in the wireless receiver of the system shown in FIG. 38.
FIG. 41 is an explanatory view for another embodiment of the system according to the present invention as applied to a remote controlling system for opening and closing a garage door.

In addition, the wireless transmission-reception control system according to the present invention may also be employed for opening and closing operation of garage entrance doors, as schematically shown in FIG. 41, in which event the chime 48 in the embodiment of FIG. 8 is replaced by a door elevator 160 and the wireless transmitters 11, 11*a* . . . are provided respectively with three operating switches 24 for elevating, lowering, and stopping the door.

It should be appreciated that the wireless transmission-reception control system according to the present invention can be employed in various types of remote operating systems.

What is claimed is:

1. A wireless transmission-reception control system comprising:

a plurality of wireless transmitters respectively transmitting radio waves including transmission data including, for each transmitter, a unique ID code; and a wireless receiver for receiving of radio waves, the wireless receiver including mode switching means for automatically switching an operating state of the wireless receiver between a registering mode for registering the ID codes in received radio waves and a normal mode for processing the transmission data, the mode switching means including:

start switch means for switching the wireless receiver into the registering mode in response to reception of radio waves from one of the plurality of wireless transmitters, and a retriggerable timer circuit activated by the start switch means for maintaining the wireless receiver in the registering mode for a predetermined time period and for automatically switching the wireless receiver to the normal mode after the predetermined time period elapses wherein the predetermined time period is restarted upon the registering of each unique ID.

* * * * *